US012110992B2

(12) United States Patent
Yoshikawa et al.

(10) Patent No.: US 12,110,992 B2
(45) Date of Patent: Oct. 8, 2024

(54) THREADED JOINT OF PIPE AND METHOD FOR CONNECTING SAME

(71) Applicant: JFE STEEL CORPORATION, Tokyo (JP)

(72) Inventors: Masaki Yoshikawa, Tokyo (JP); Seigo Goto, Tokyo (JP); Seiji Ozaki, Tokyo (JP); Hideo Sato, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/044,990

(22) PCT Filed: Sep. 30, 2020

(86) PCT No.: PCT/JP2020/037353
§ 371 (c)(1),
(2) Date: Mar. 13, 2023

(87) PCT Pub. No.: WO2022/070367
PCT Pub. Date: Apr. 7, 2022

(65) Prior Publication Data
US 2023/0383875 A1    Nov. 30, 2023

(51) Int. Cl.
*F16L 15/04*    (2006.01)
*F16L 15/06*    (2006.01)
(52) U.S. Cl.
CPC ............. *F16L 15/04* (2013.01); *F16L 15/06* (2013.01)
(58) Field of Classification Search
CPC ......... F16L 15/04; F16L 15/06; F16L 15/001; E21B 17/042
See application file for complete search history.

(56) References Cited

U.S. PATENT DOCUMENTS 4,373,750 A * 2/1983 Mantelle ............... E21B 17/042
                                                        285/55
4,962,579 A * 10/1990 Moyer ................. E21B 17/042
                                                        285/334
(Continued)

FOREIGN PATENT DOCUMENTS

EP           1389705 A1    2/2004
JP        2003512588 A     4/2003
(Continued)

OTHER PUBLICATIONS

May 31, 2022, Notification of Reasons for Refusal issued by the Japan Patent Office in the corresponding Japanese Patent Application No. 2021-528462 with English language Concise Statement of Relevance.

(Continued)

*Primary Examiner* — David Bochna
(74) *Attorney, Agent, or Firm* — KENJA IP LAW PC

(57) ABSTRACT

A threaded joint wherein a relationship between shoulder angle parameters and thread taper angle parameters for a coupling and a pair of pins inserted from both ends of the coupling is defined by the following expression (1), and a tightening torque with which the threaded joint is tightened is 60% or more and 85% or less of a yield torque determined by the following expression (2):

$$-1.5° \leq \Delta\theta - \Delta\omega \leq 2.0°, \quad (1)$$

$$T = (T_S + T_D)\frac{1}{12} \quad (2)$$

$$T_S = f_i P_c \frac{E_7}{2}(2\pi E_7)L_4 \frac{1}{2}$$

(Continued)

-continued $$P_c = E\frac{\rho_m}{2}\frac{\left(\left(\frac{W}{2}\right)^2 - \left(\frac{E_7}{2}\right)^2\right)\left(\left(\frac{E_7}{2}\right)^2 - \left(\frac{d}{2}\right)^2\right)}{2\left(\frac{E_7}{2}\right)^3\left(\left(\frac{W}{2}\right)^2 - \left(\frac{d}{2}\right)^2\right)}$$

$$T_D = Y_m A_S \left(\frac{P}{2\pi} + \frac{R_t f_s}{\cos\Theta} + R_s f_s\right).$$

5 Claims, 15 Drawing Sheets

(56) References Cited

U.S. PATENT DOCUMENTS

| | | | |
|---|---|---|---|
| 6,543,816 B1 | 4/2003 | Noel | |
| 9,194,190 B2 | 11/2015 | Sonobe et al. | |
| 2004/0118569 A1 | 6/2004 | Brill et al. | |
| 2004/0228679 A1* | 11/2004 | Reavis | F16L 15/001 |
| | | | 403/307 |
| 2016/0123508 A1* | 5/2016 | Tejeda | E21B 17/042 |
| | | | 285/390 |
| 2017/0307114 A1* | 10/2017 | Suzuki | E21B 17/042 |
| 2018/0051835 A1* | 2/2018 | Lane | E21B 17/042 |
| 2019/0331262 A1 | 10/2019 | Goto | |

FOREIGN PATENT DOCUMENTS

| | | |
|---|---|---|
| JP | 2004076843 A | 3/2004 |
| JP | 2006189089 A | 7/2006 |
| JP | 2009243613 A | 10/2009 |
| JP | 2012067908 A | 4/2012 |
| JP | 4930647 B1 | 5/2012 |
| WO | 2018003455 A1 | 1/2018 |

OTHER PUBLICATIONS

Nov. 10, 2020, International Search Report issued in the International Patent Application No. PCT/JP2020/037353.
Recommended Practice for Drill Stem Design and Operating Limits, API Recommended Practice 7G, Aug. 1998, 16th Edition, American Petroleum Institute.
Threading, Gauging, and Inspection of Casing, Tubing, and Line Pipe Threads, API Specification 5B, Dec. 2017, 16th Edition, American Petroleum Institute.
Jun. 6, 2024, Office Action issued by the Canadian Intellectual Property Office in the corresponding Canadian Patent Application No. 3,190,633.

* cited by examiner $\Delta \theta = \theta A + \theta B$

FIG. 5B
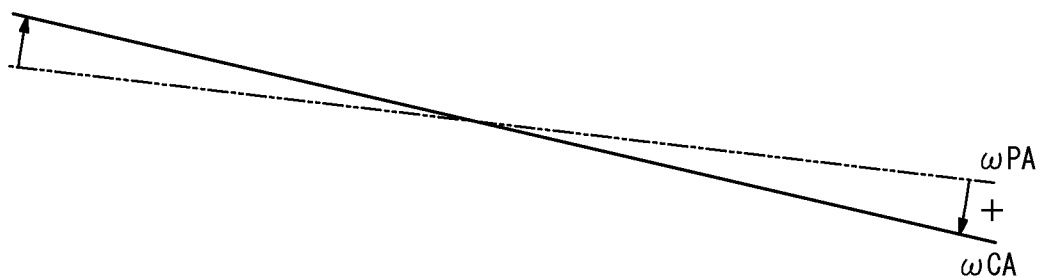
the pin thread taper angle ωPA is shallower than ωCA (PSBF)
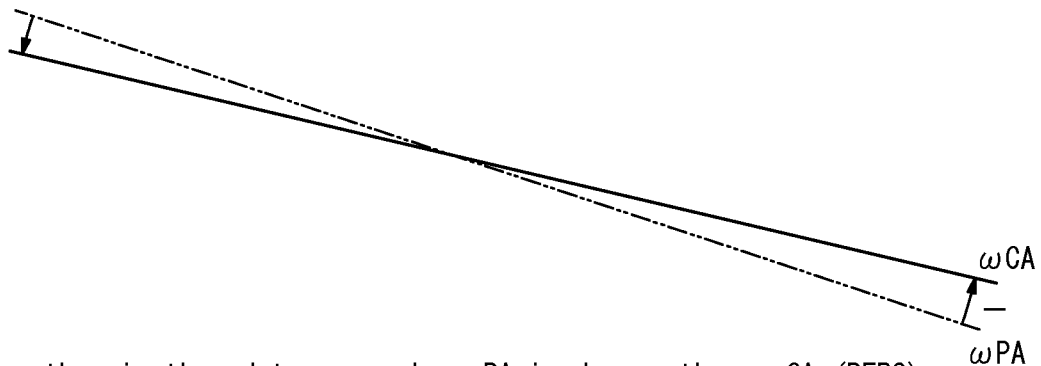
the pin thread taper angle ωPA is deeper than ωCA (PFBS)

Case 0

Case 1

Case 2

THREADED JOINT OF PIPE AND METHOD FOR CONNECTING SAME

TECHNICAL FIELD

This disclosure relates to a threaded joint of steel pipes for connecting oil country tubular goods including tubing and casing used for exploration and production of oil and gas wells, steel pipes applied to geothermal wells which use high temperature steam for power generation, and so on, in which pins which are threadedly connected from both ends of a coupling are abutted against each other at the center of the inner surface of the coupling.

BACKGROUND

Threaded joints are widely used for the connection of steel pipes used in oil industry equipment such as oil country tubular goods. Oil country tubular goods, referred to as casing and tubing, are used for excavation and production of crude oil and natural gas wells, and threaded joints 100 as specified in the American Petroleum Institute (API) 5B standard, illustrated in FIG. 1A, have traditionally been used to connect such oil country tubular goods. However, in order to cope with the recent trends for deeper crude oil and natural gas wells with depths of 4,000 m to 10,000 m and the development of wells in extreme environments such as offshore and polar regions, higher performance threaded joints that can pass the tests specified in ISO13679 and API5C5 Connection Application Level 4 (CAL4) are required. Therefore, for these applications, a threaded joint 300 called a premium joint as described in FIG. 2 and JP 4930647 B (PTL 3), for example, is used, which is capable of maintaining airtightness even under combined loads such as high tension, compression, bending, internal pressure, and external pressure.

On the other hand, the development of relatively shallow onshore wells with depths of 2,000 m to 3,000 m to extract shale oil and shale gas has been progressing in recent years. In shale development, when drilling horizontal wells along shale formations, pipes and joints are inserted while being rotated. Thus, for example, threaded joints 200 for oil country tubular goods in which shoulders of pin tips are abutted against each other, which can set a high tightening torque, as described in FIG. 1B and JP 2004-76843 A (PTL 1) and US 2004/118569 A (PTL 2), may be used.

FIG. 1B, which is a longitudinal cross-sectional view of a threaded joint 200 of a circular pipe, schematically illustrates a threaded joint 200 for oil country tubular goods in a coupling form such that shoulders 201 of pin tips are abutted against each other. The threaded joint 200 usually has a tapered thread 203 in each pipe 202 and a shoulder 201, also known as a torque shoulder portion, at an end of each pin. The threaded joint 200 does not have a seal 302 as found in the premium joint. A joint, referred to as a coupling 204, has a tapered thread 205 at each end. The tapered threads 205 are screwed into tapered threads 203 machined at respective pipe ends of the pipes 202. The coupling 204 does not have a shoulder portion 303 as found in the premium joint. The tapered threads 203 and 205 are important for tightly securing the pipe joints. When pins 206 having tapered threads 203 are inserted into the coupling 204 also having tapered threads 205, radial interference is created to secure the pins 206 in the coupling 204.

The coupling 204 comprises female thread members corresponding to the male thread members referred to as the pins 206. One pin 206a and the other pin 206b, which are connected to the coupling 204, have male threads machined on their outer surfaces as tapered threads 203, and have shoulders 201 at their distal ends. The coupling 204 with opposing ends has, on its inner surface, female threads as tapered threads 205 that can be screwed into the male threads. For example, one pin 206a is tightened in advance in the factory until it reaches the center line in the axial direction of the coupling 204, and the other pin 206b is tightened on site so as to be abutted against the shoulder 201 of the one pin 206a, which has already been tightened in the factory, to complete the tightening. The shoulder portion 201 of the one pin 206a also serves as a stopper to provide a proper tightening stop position for the other pin 206b when tightening the other pin 206b on site. As a result of the on-site tightening, the shoulder faces of both pins at their distal ends are directly abutted against each other, creating a high tightening torque that allows the pipes 202 and the threaded joint 200 to rotate and propel through a wellbore even when the wellbore to be drilled is a horizontal wellbore.

CITATION LIST

Patent Literature

PTL 1: JP 2004-76843 A
PTL 2: US 2004/118569 A
PTL 3: JP 4930647 B

Non-Patent Literature

NPL 1: API5B Threading, Gauging, and Inspection of Casing, Tubing, and Line Pipe Threads, Dec. 1, 2017
NPL 2: API7G Recommended Practice for Drill Stem Design and Operating Limits, Dec. 1, 1998

SUMMARY

Technical Problem

The premium joint illustrated in FIG. 2 is composed of three regions, a thread section 301, a seal section 302, and a shoulder section 303, each of which has a separate function. In particular, since the premium joint has the independent seal section 302, it is highly airtight even under high combined loads, while the dimensional accuracy of machining is high and the price is high. Accordingly, such a premium joint is generally used in extreme environments such as deep sea development. It is thus difficult to say that the premium joint is a suitable threaded joint that satisfies both cost and performance requirements for shale development.

In shale development, when a horizontal well is drilled along shale formations, pipes and joints are inserted into a target site while rotating, and threaded joints with high tightening torque are preferred. Such threaded joints are required to withstand plastic deformation caused by high stress on the pressure receiving face against high torque, and, at the same time, to have seizure resistance and airtightness. Threaded joints for shale development require a balance between price and joint performance such as high torque, seizure resistance, and airtight performance.

In a well where a high torque is required for screw make-up, compared with the threaded joint 100 in FIG. 1A, in which pins 101 and a coupling 102 of an APIBTC thread, which is a general-purpose thread, are connected only by thread fitting, the threaded joint 200 in FIG. 1B, in which in addition to thread fitting of the pins 206 and the coupling 204, the shoulders 201 of the pins at their distal ends are abutted against each other, is reasonable in generating a high tightening torque.

However, the distal ends of the pins 206 inserted from both pipe ends of the coupling 204 (for convenience, one end is also referred to as the end A and the other as the end B), respectively, are not necessarily abutted against each other in an ideal way, but strictly speaking, unevenly contact each other. This uneven contact causes excessively strong contact on the inner or outer diameter side of the shoulder faces, which are the end faces of the shoulders 201 of the pins at their distal ends, in the process of screw make-up. This results in plastic deformation occurring in the shoulder faces even when the tightening torque is still low, which reduces the yield torque (as described in paragraph 0015 below) and increases the risk of galling (metal-to-metal seizure) occurring during tightening.

The form of abutment of the shoulders 201 of the pins at their distal ends at both ends A and B is illustrated in FIGS. 3A-3C as the relative positional relationship of the other pin 206b (also referred to as pin B for convenience) with respect to the shoulder face of the one pin 206a (also referred to as pin A for convenience). FIGS. 3A-3C each schematically illustrate a cross-section of the shoulder 201 just before abutment at section A of FIG. 1B.

As factors affecting the state of abutment between the shoulders 201 of the pins at their distal ends, the following are considered, although the degree of influence may be small or large:
(1) deflection of the pins at their distal ends downward (toward the inner surfaces of the pipes) due to diameter reduction caused by thread fitting;
(2) vertical machining finish of the shoulder faces;
(3) thread taper angle difference between the pins 206 and the coupling 204;
(4) difference in the factors (2) and (3) between the pin A side and the pin B side.

This form of abutment also affects the following basic performance of the threaded joint:
(i) Yield torque (the torque at which, in the process of tightening the pins 206 at both ends of the coupling 204, plastic deformation of the shoulder faces that resist tightening progresses and the relationship between the tightening torque and the number of turns begins to show nonlinearity);
(ii) make and break performance (no sticking occurs up to a predetermined number of cycles over which the threaded joint 200 is made up and broken out cyclically with a torque set below the yield torque); and
(iii) airtight performance (no leakage of gas or water, which are pressure media, from the threaded joint 200 even when a combined load of axial tension and compression, internal pressure, and external pressure is applied after the threaded joint 200 is tightened).

In a premium joint of Thread and Coupling (T&C) type as proposed in PTL 3, a coupling has at its center a shoulder which extends toward the inner diameter side of the pipe, and tightening is achieved up to a specified torque through thread fitting via a metal-to-metal seal between the outer circumference of nose portions of pins and the inner circumference of the coupling, followed by abutment between the shoulders of the pins and the shoulder of the coupling. Compared to a threaded joint in which the shoulders of the pins at their distal ends are abutted against each other, the shoulders of the pins paired with the shoulder of the coupling are machined surfaces, resulting in a contact condition with relatively little variation. However, the premium joint with the aforementioned structure requires extremely high dimensional accuracy for each component, which increases the manufacturing cost. For example, the thread interference on diameter in the premium joint described in PTL 3 is managed to be less than half the dimension of the APIBTC thread described in API5B Threading, Gauging, and Inspection of Casing, Tubing, and Line Pipe Threads, Dec. 1, 2017 (NPL 1).

The threaded coupling proposed in PTL 1 is characterized by the fact that a pin is tightened in the factory with a high torque in advance so as to reach the opposite side of the coupling beyond the center line in the axial direction of the coupling in order to prevent the pin from turning when tightened on site. Thus, PTL 1 does not focus on the effect of the abutment faces on the performance of the threaded joint.

The threaded joint proposed in PTL 2 is also characterized by the fact that the tightening torque can be set higher on the factory tightening side than that on the factory tightening side by increasing the thread interference on diameter on the factory tightening side in advance compared to that on the factory tightening side in order to prevent the pin on the factory tightening side from turning when tightened on site. Thus, PTL 2 does not focus on the effect of the abutment faces on the performance of the threaded joint.

It would thus be helpful to provide a threaded joint in which shoulders of the pins at their distal ends are abutted against each other, in which the relationship between the shoulder angle and the thread taper angle is suitably adjusted to avoid excessive plastic deformation of the shoulder faces and to maintain and improve the performance of the threaded joint, taking into consideration that the abutment faces at the distal ends of the pins inserted from both ends of A and B are affected by the vertical machining finish of the shoulders and the thread taper angle in addition to a high tightening torque, and a method of connecting the same.

Solution to Problem

In order to address the above issues, primary features of the present disclosure are as follows.

[1] A threaded joint comprising: a pair of pins each having a male thread, as a male tapered thread, provided on an outer circumferential surface at a distal end of a first steel pipe; and a coupling having female threads, as female tapered threads, provided on an inner circumferential surface at both ends of a second steel pipe, the female threads being configured to be screwed into the male threads, wherein the threaded joint is configured such that shoulder faces at the distal ends of the pair of pins are brought into contact with each other when the male threads are screwed into the female threads at both ends of the coupling, a relationship between shoulder angle parameters and thread taper angle parameters for the coupling and the pair of pins inserted from both ends of the coupling is defined by the following expression (1), and a tightening torque with which the threaded joint is tightened is 60% or more and 85% or less of a yield torque determined by the following expression (2):

$$-1.5° \leq \Delta\theta - \Delta\omega \leq 2.0° \quad (1),$$

where $\Delta\theta$ is a shoulder angle parameter that is a sum of shoulder angles $\theta A$ and $\theta B$ before tightening of the pair of pins, i.e., $\Delta\theta = \theta A + \theta B$, and Δω is a thread taper angle parameter that is a sum of thread taper angle differences ΔωA and ΔωB before tightening of the coupling and the pair of pins, i.e., Δω=ΔωA+ΔωB, $$T = (T_S + T_D)\frac{1}{12} \quad (2)$$

$$T_S = f_t P_c \frac{E_7}{2}(2\pi E_7)L_4 \frac{1}{2}$$

$$P_c = E\frac{\rho_m}{2} \frac{\left(\left(\frac{W}{2}\right)^2 - \left(\frac{E_7}{2}\right)^2\right)\left(\left(\frac{E_7}{2}\right)^2 - \left(\frac{d}{2}\right)^2\right)}{2\left(\frac{E_7}{2}\right)^3\left(\left(\frac{W}{2}\right)^2 - \left(\frac{d}{2}\right)^2\right)}$$

$$T_D = Y_m A_s\left(\frac{P}{2\pi} + \frac{R_t f_s}{\cos\Theta} + R_s f_s\right),$$

where
T is yield torque [ft-lbf],
$T_S$ is shouldering torque [inch-lbf],
$T_D$ is delta torque [inch-lbf],
$P_c$ is thread contact pressure [psi],
$f_t$ is thread frictional coefficient (=0.035),
$f_s$ is thread frictional coefficient (=0.080),
$E_7$ is thread pitch diameter [inch],
$L_4$ is thread length [inch],
w is coupling outer diameter [inch],
d is pipe inner diameter [inch],
$D_{bv}$ is bevel diameter [inch],
P is thread lead (=1/$T_{Pl}$) [inch],
$\rho_m$ is thread interference on diameter [inch],
$A_s$ is shoulder cross-sectional area (=π($Dbv^2-d^2$)/4) [$inch^2$],
$R_t$ is average mean thread radius (=$E_7$/2) [inch],
$R_s$ is average shoulder radius (=($D_{bv}$+d)/4),
Θ is thread flank angle [deg.],
E is Young's modulus [psi], and
Ym is material yield stress [psi].

[2] The threaded joint according to the aspect [1], wherein the relationship is defined by the following expression (3):

$$0° \leq \Delta\theta - \Delta\omega \leq 2.0° \quad (3).$$

[3] The threaded joint according to the aspect [1] or [2], wherein the shoulder angle parameter Δθ is −1.21° ≤ Δθ ≤ 1.83°.
[4] The threaded joint according to any one of the aspect [1] to [3], having a thread fitting ratio of 0.0032 or more and 0.0059 or less.
[5] A method of connecting a threaded joint, the method comprising: in order to connect the threaded joint as recited in any one of the aspect [1] to [4], controlling a position of tightening of one of the pair of pins that is thread-fitted into the coupling first to be at an axial center of the coupling with a jig indicating a tightening stop position of the one of the pair of pins inserted from one end of the coupling; and then tightening the other of the pair of pins such that shoulder faces of the one and the other of the pair of pins are abutted against each other.

Advantageous Effect

In view of the importance of the contact condition of the shoulder abutment faces to the seizure resistance and airtightness of the threaded joint, the present disclosure specifies a suitable range of shoulder angle parameters of the pair of pins that directly affect the shoulder abutment, while considering the thread taper angle difference between the pair of pins inserted into the coupling and the coupling. Therefore, according to the present disclosure, stress concentration and plastic deformation that would otherwise be caused by strong contact due to uneven contact between the shoulder faces of the pins can be avoided, which contributes to stabilizing and improving the tightening torque performance and airtight performance of the threaded joint. In addition, since the present disclosure is not directed to a special thread (premium joint), it does not have a long sealing section, and the length to be cut and the processing time are short, which makes the present disclosure cost competitive and versatile. In addition, the present disclosure makes it possible to have both seizure resistance and airtightness in the shoulders, which were responsible only for the function of generating high torque, even when compared with a conventional threaded joint of the type in which shoulder faces are abutted against each other as illustrated in FIG. 1B, thereby improving the make and break performance and airtight performance.

BRIEF DESCRIPTION OF THE DRAWINGS

In the accompanying drawings:
FIG. 5B is a diagram for explaining the thread taper angle difference parameter Δω.

DETAILED DESCRIPTION

Embodiments of the present disclosure will be described below with reference to the accompanying drawings.

As a result of various examinations of threaded joints in which shoulders of pins at their distal ends are abutted against each other, the present inventors found that it is effective to set the tightening torque to a high torque below the yield torque and to specify a suitable relationship between the shoulder angle $\theta$ at the distal end of each pin and the thread taper angle $\omega$ of each pin and each coupling thread.

Figure 4:
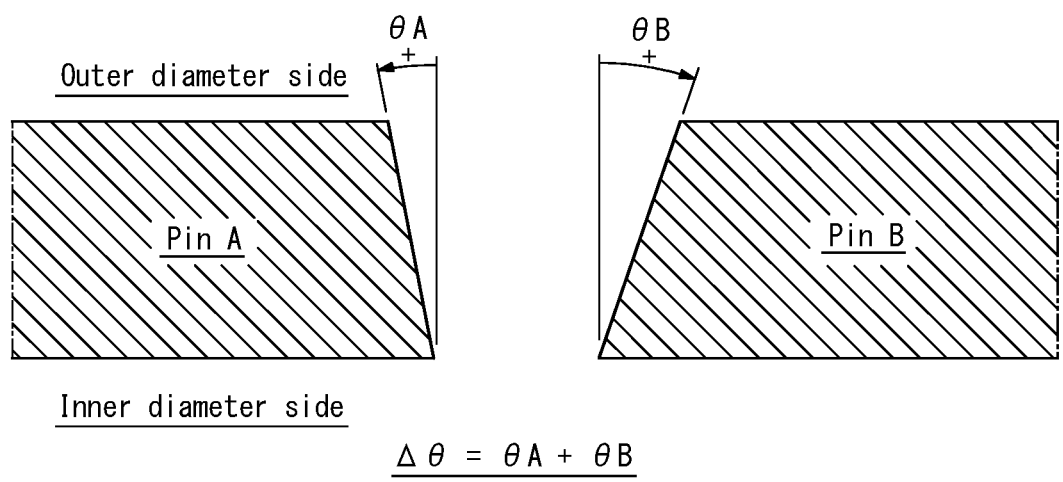
FIG. 4 is a diagram for explaining the shoulder angle parameter Δθ.
Figure 5A:
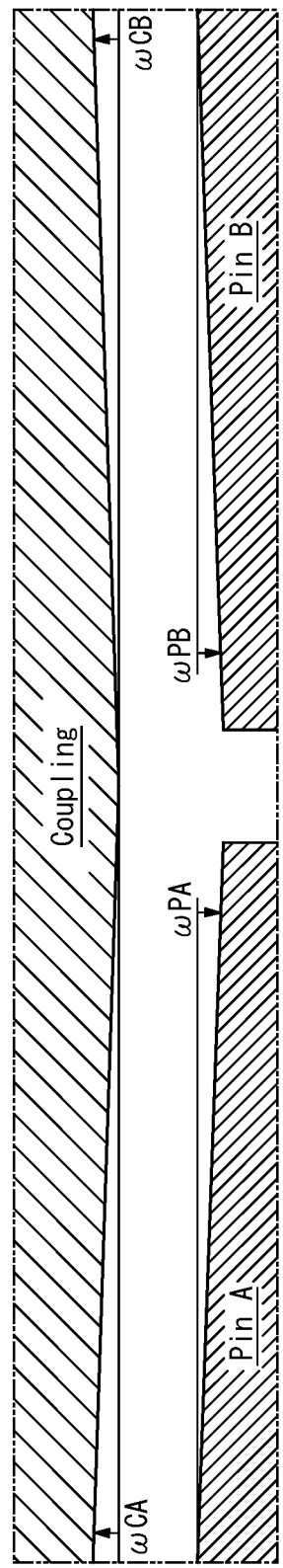
FIG. 5A is a diagram for explaining the thread taper angle.

The shoulder angle parameter $\Delta\theta$ is illustrated in FIG. 4, and the thread taper angle parameter $\Delta\omega$ in FIGS. 5A and 5B.

As illustrated in FIG. 4, the shoulder angle is set at 0° for the case of right-angle cutting work, and the inclination of the shoulder face where a space opens on the shoulder outer diameter side is expressed here as positive and its opposite as negative. Since each of the pair of pins has a shoulder, if the shoulder angle of the pin on the end A side (called the pin A for convenience) is $\theta A$ and the shoulder angle of the pin on the end B side (called the pin B for convenience) is $\theta B$, the shoulder angle parameter $\Delta\theta$ is $\Delta\theta = \theta A + \theta B$.

Next, the thread taper angle difference will be described below. The thread taper is set to a designed value that indicates its slope, but in real-world manufacturing, the thread taper has a tolerance range. If there is an angular difference between the thread tapers of each pin and the coupling, the coupling generally has an outer diameter larger than that of the pipe body and a pipe thickness larger than that of the pipe body, and thus it has high rigidity and is forced to tilt along the thread taper surface of the coupling.

It is common for the pins and the coupling to have the same value as a tapered thread, e.g., the APIBTC thread in NPL 1 has a 1/16 taper. The 1/16 taper represents the inclination at which the diameter decreases by 0.0625 inch in the radial direction when advancing 1 inch in the axial direction, and is converted to an angle of 3.5763°. The reason why the thread taper angle difference is taken into account is that the tapered thread fitting between the pins and the coupling progresses during the tightening process, and the pins move forward in the coupling in the direction of the pipe axis, but because the coupling is more rigid than the pins, the pin thread taper of each pin forces the shoulder face, which is an end face of the pin positioned at the front end of the thread, to tilt by the amount of the angle difference along the taper of the corresponding coupling thread face.

As illustrated in FIGS. 5A and 5B, when the pin thread taper angle $\omega PA$ is shallower than $\omega CA$ (PSBF), the pin tilts downward (toward the inner diameter) along the corresponding coupling thread face. On the other hand, if the pin thread taper angle $\omega PA$ is deeper than $\omega CA$ (PFBS), the pin tilts upward (toward the outer diameter) along the coupling thread face. To set the thread taper angle difference, when there is a thread taper angle difference $\Delta\omega A$ between the pin A and the end A side of the coupling, and similarly, when there is a thread taper angle difference $\Delta\omega B$ between the pin B and the end B side of the coupling, and let the direction in which each pin thread tilts downward along the corresponding coupling thread face in the figure be defined as positive, then the following relations are satisfied: $\Delta\omega A = \omega CA - \omega PA$, and similarly, $\Delta\omega B = \omega CB - \omega PB$. Considering both the two pins A and B and the corresponding end A and end B sides of the coupling, the thread taper angle difference parameter $\Delta\omega$ is given by: $\Delta\omega = \Delta\omega A + \Delta\omega B$.

Figure 6A:
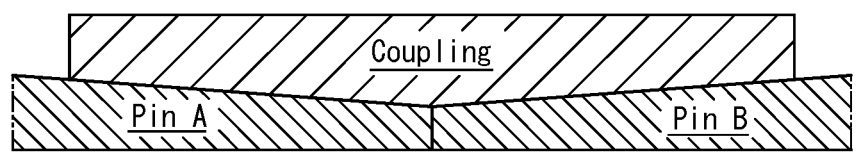
FIG. 6A is a diagram for explaining the effect of the thread interference on diameter on the shoulder angle parameter Δθ.
Figure 6B:
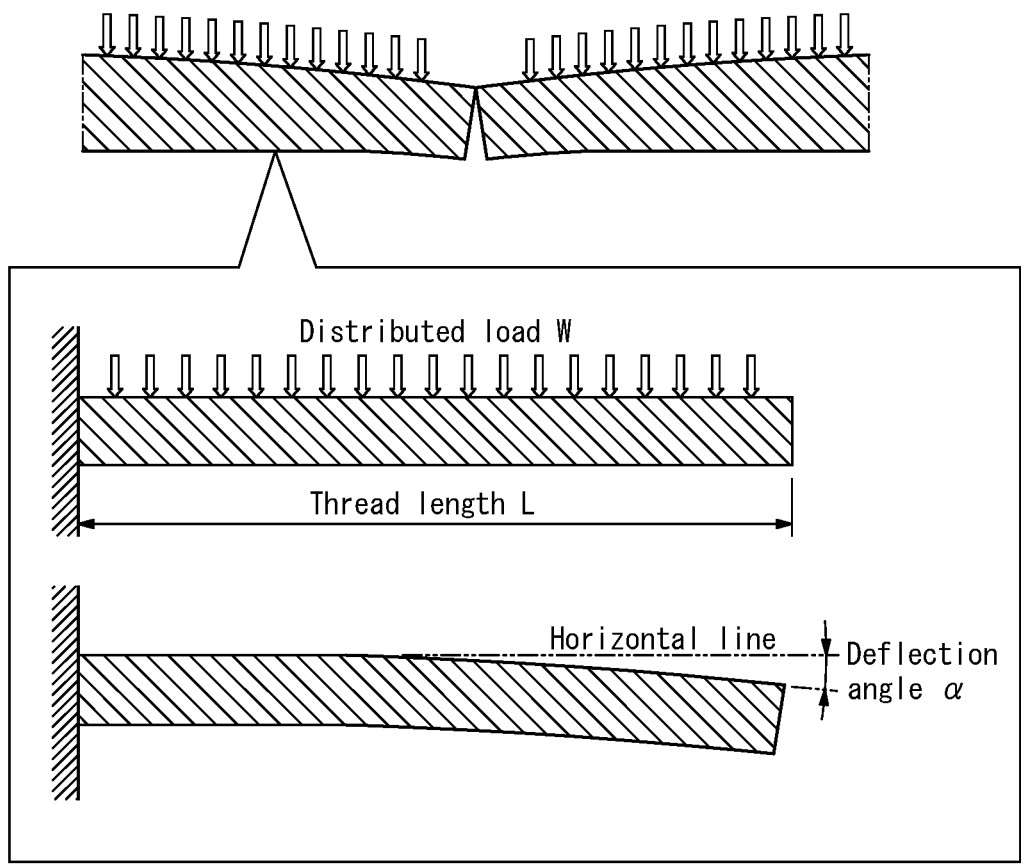
FIG. 6B is a diagram for explaining the effect of the thread interference on diameter on the shoulder angle parameter Δθ.

The larger the positive value of the thread taper angle difference parameter, the more the shoulder face at the distal end of the pin positioned at the front end of the thread is inclined downward, and the inclination is such that a space opens on the shoulder inner diameter side. In addition, the shoulder at the distal end of each pin is deflected downward (toward the pipe inner surface side) even by the diameter reduction of the pin as illustrated in FIGS. 6A and 6B, as can be analogized from the Shrink Fit Theorem, due to the thread interference on diameter associated with thread fitting. Even if the shoulder face at the distal end of each pin is manufactured vertically as designed, when the shoulder faces of the pins are abutted against each other, the contact starts from the outer diameter side of each shoulder face, and gradually the inner diameter side of the shoulder comes into contact. The deflection angle $\alpha$ illustrated in FIG. 6B is calculated by $\alpha = WL^3/6EI$, and the equidistributed load W is a function of the thread interference on diameter $\delta$, contact diameter D, inner diameter ID, and outer diameter OD calculated by the shrink fit equation.

The present inventors conducted numerical analysis (Finite Element Analysis: FEA) several times using the shoulder angle parameter $\Delta\theta$ as a variable, and obtained knowledge about the effect on the threaded joint performance. As representative examples, the analysis results for Case 0, Case 1, and Case 2 will be described in turn.

Figure 7A:
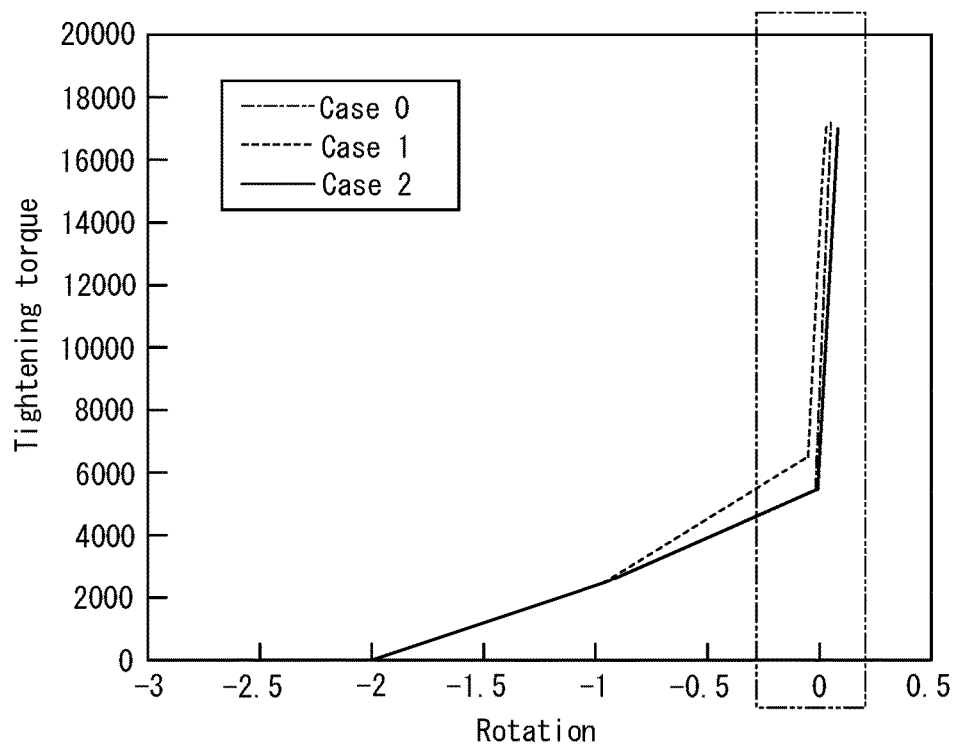
FIG. 7A is a graph illustrating the relationship between the tightening torque and the number of turns.
Figure 7B:
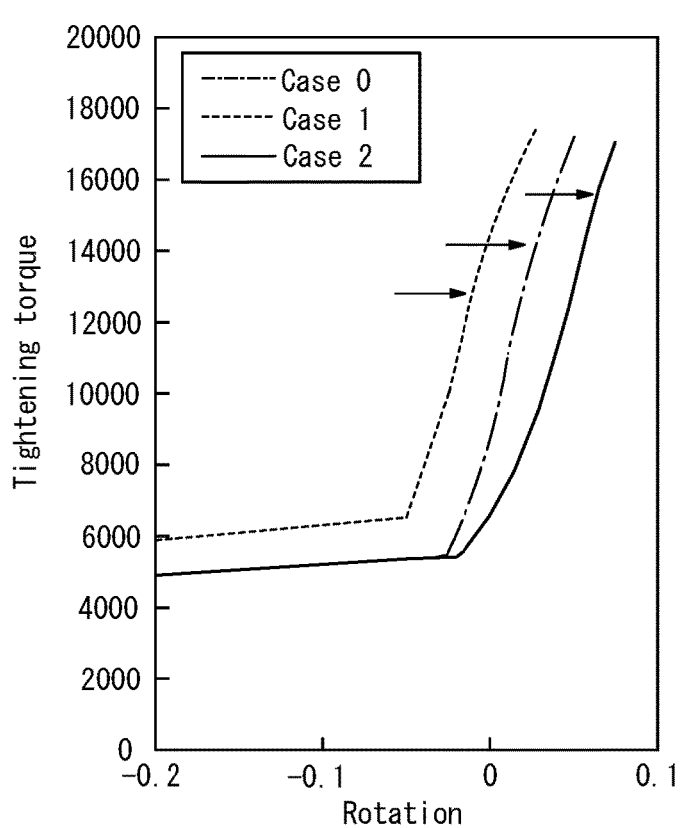
FIG. 7B is a partially enlarged view of FIG. 7A.

Case 0: Shoulder angle parameter $\Delta\theta = 0°$
Case 1: Shoulder angle parameter $\Delta\theta = -2°$
Case 2: Shoulder angle parameter $\Delta\theta = +2°$ FIGS. 7A and 7B show the relationship between the tightening torque and the tightening speed when the pin A is first thread-fitted into the end A side of the coupling to the center of the coupling in the axial direction, and then the pin B is fitted from the end B side. The position indicated by the arrow in the figure represents the yield torque (the starting point at which plastic deformation of the shoulder faces advance and the relationship between the tightening torque and the number of turns begins to show nonlinearity) for each case.

Figure 8A:
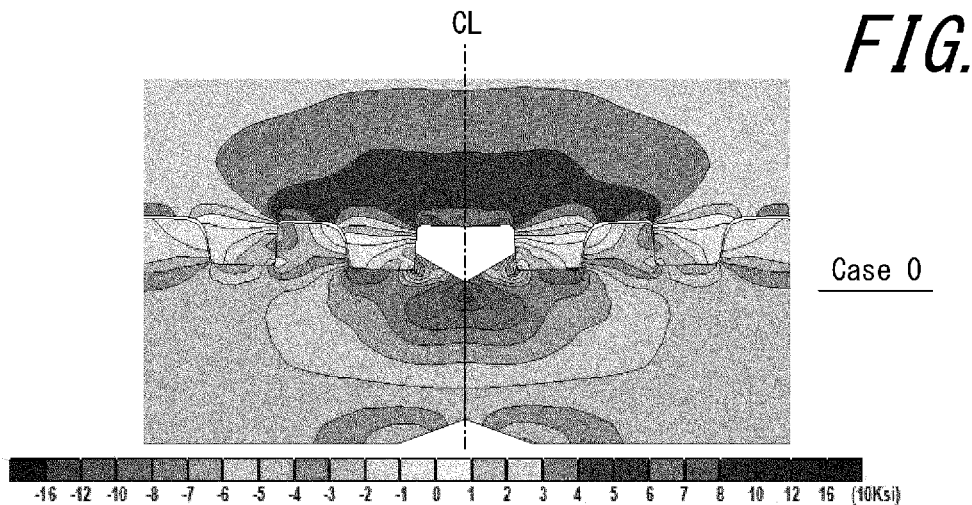
FIG. 8A is a cross-sectional view illustrating an axial stress distribution in a near shoulder region in Case 0.
Figure 8B:
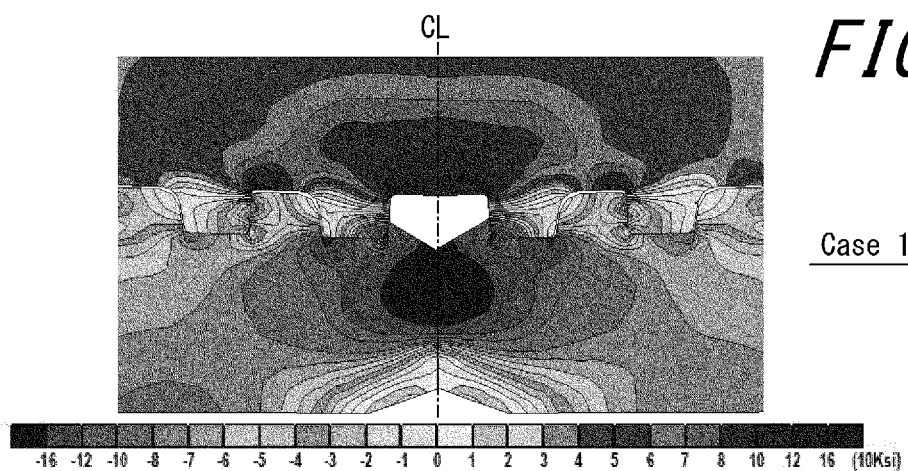
FIG. 8B is a cross-sectional view illustrating an axial stress distribution in a near shoulder region in Case 1.
Figure 8C:
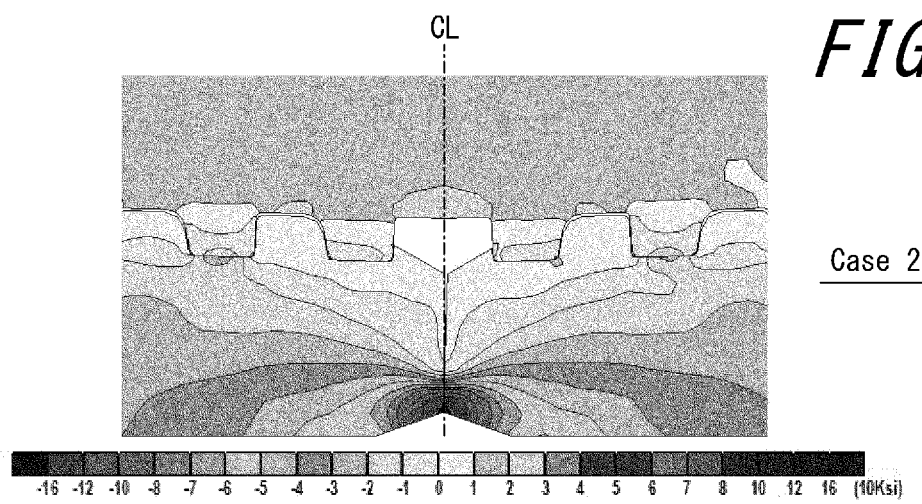
FIG. 8C is a cross-sectional view illustrating an axial stress distribution in a near shoulder region in Case 2.

FIGS. 8A-8C each show an axial stress distribution in a near-shoulder region when the pin B reaches a reference position CL (a linearly symmetrical position about the center of the coupling) in each case. In Case 0 where the shoulder angle parameter $\theta$ is set at 0° as the initial value, it can be seen that contact is made over the entire shoulder faces, although there is some strong contact on the shoulder outer diameter side due to downward (toward the pipe inner surface side) deflection caused by diameter reduction associated with thread fitting. In Case 1 where the shoulder angle parameter $\theta$ is set at −2° as the initial value, due to the displacement caused by the deflection deformation associated with the thread fitting, strong contact has already occurred on the shoulder outer diameter side at the reference position CL, while the shoulder inner diameter side has not yet made contact. In Case 2 where the shoulder angle parameter $\theta$ is set at +2° as the initial value, contact on the shoulder outer diameter side due to deflection deformation associated with the thread fitting is avoided, and unlike Case 0 and Case 1, the contact starts from the shoulder inner diameter side.

Figure 9:
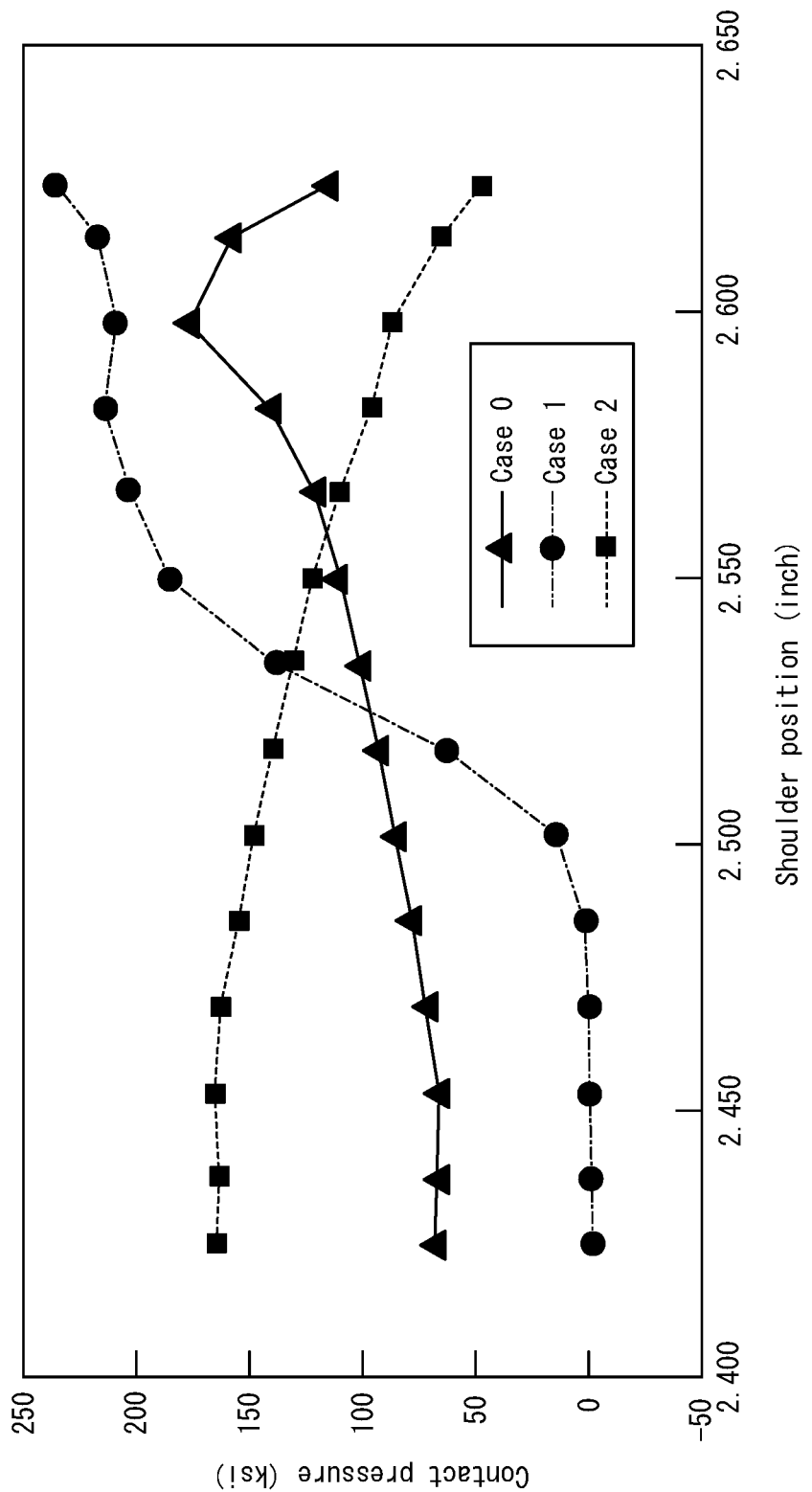
FIG. 9 is a graph illustrating the contact pressure distribution of the shoulder faces at yield torque for each case.

FIG. 9 illustrates the contact pressure distribution on the shoulder face at yield torque for each case. When the shoulder angle parameter is negative, as in Case 1, the shoulders are abutted against each other on the outer diameter side first, and there is also deflection toward the inner diameter side of the pipe due to the thread interference on diameter. Thus, plastic deformation progresses as the pin B moves toward the pin A due to tightening, and as illustrated in FIG. 7B, the number of turns in Case 1 is lower than those in Case 0 and Case 2.

As can be seen from the FEA results of these three representative cases, the axial stress distribution near the shoulder face and the contact pressure distribution on the shoulder face in FIGS. 8A-8C and FIG. 9 were found to have different contact tendencies and stress states depending on slight differences in the angle of the shoulder abutment faces. This way of abutment has an impact on the basic performance of the threaded joint, including: (i) yield torque (the torque at which, in the process of tightening the pins at both ends of the coupling, plastic deformation of the shoulder faces that resist tightening progresses and the relationship between the tightening torque and the number of turns begins to show nonlinearity), (ii) make and break performance (no seizure occurs up to a predetermined number of cycles over which the threaded joint is made up and broken out cyclically with a predetermined torque), and (iii) airtight performance (no leakage of gas or water, which are pressure media, from the threaded joint even when a combined load of axial tension and compression, internal pressure, and external pressure is applied after the threaded joint 200 is tightened). In view of this, in the threaded joint where the shoulders at the distal ends of the pins are abutted against each other, the present inventors found a suitable relationship between the shoulder angle parameter $\Delta\theta$ at the distal end of each pin and the thread taper angle difference $\Delta\omega$ of each pin and each coupling thread, as described below.

In general, tightening a threaded joint with a high tightening torque generates a high contact pressure on the shoulder contacting surface, which improves the airtight performance. However, high contact pressures and uneven contact pressure distribution on the contact surface cause local plastic deformation and increase the risk of metal-to-metal seizure during tightening and untightening of the threaded joint. If the threaded joint is tightened with a low tightening torque, the risk of metal-to-metal seizure during tightening and untightening of the threaded joint is reduced because the contact pressure on the shoulder contacting surface is low. However, if the contact pressure on the shoulder abutment face is low, the internal fluid pressure acting on the threaded joint itself or the combined load of that pressure and the axial tensile load will make it impossible to maintain an airtight condition. Thus, it can be seen that the seizure resistance and the airtight performance have conflicting properties, and it is even more important to make the contact condition of the abutment faces favorable.

The threaded joint 1 according to one embodiment of the present disclosure described below is based on the above ideas, means and methods.

Figure 10:
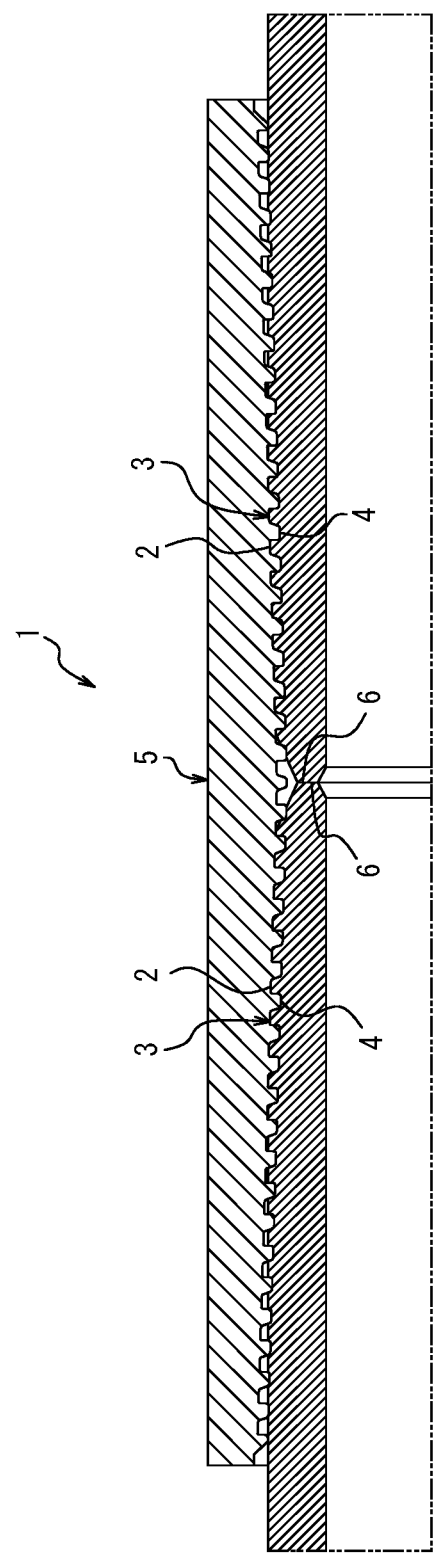
FIG. 10 is a cross-sectional view illustrating a part of the threaded joint according to one of the embodiments of the present disclosure.

FIG. 10 illustrates a threaded joint 1 according to one embodiment of the present disclosure. The threaded joint 1 comprises a pair of pins 3, each having a male thread 2, as a male tapered thread, provided on an outer circumferential surface at a distal end of a first steel pipe, and a coupling 5 having female threads 4, as female tapered threads, provided on an inner circumferential surface at both ends of a second steel pipe, the female threads being configured to be screwed into the male threads 2. The threaded joint 1 is configured such that shoulder faces 6 at the distal ends of the pair of pins 3 are brought into contact with each other when the male threads 2 are screwed into the female threads 4 at both ends of the coupling 5.

[Thread Taper Angle $\omega$ and Thread Taper Angle Parameter $\Delta\omega$]

Similar to the APIBTC thread of NPL 1 (also referred to as the conventional technology), this embodiment has a ¹⁄₁₆ thread taper by design. The ¹⁄₁₆ taper represents the inclination at which the diameter decreases by 0.0625 inch in the radial direction when advancing 1 inch in the axial direction, and is converted to an angle of 3.5763°. In real-world manufacturing, tolerances are set on the thread taper. For example, for APIBTC threads, the thread taper tolerance is 0.0610 inch/inch to 0.066 inch/inch (3.4907° to 3.776°) for the pin threads (male threads 2) and 0.060 inch/inch to 0.067 inch/inch (3.4336° to 3.8330°) for the coupling threads (female threads). In the case of an APIBTC thread, the thread taper is targeted at 0.0625 inch/inch (3.5763°) for both the pins 3 and the coupling 5.

If there is an angular difference between the thread tapers, the coupling 5 is generally rigid because it has an outer diameter larger than that of the pipe body and a pipe thickness larger than that of the pipe body, and thus it has high rigidity. Accordingly, the thread taper of each pin 3 changes angle along the thread taper surface of the coupling 5 by the amount of the angular difference. For the combination of coupling threads having a taper of 0.060 inch/inch with the shallowest inclination and pin threads having a taper of 0.066 inch/inch with a relatively deep inclination, the shoulder face at the distal end of each pin thread tilts to the positive side by 0.17°, corresponding to the difference of 0.006 inch. For the combination of coupling threads having a taper of 0.067 inch/inch with the deepest inclination and pin threads having a taper of 0.0610 inch/inch with a relatively shallow inclination, the shoulder face 6 at the distal end of each pin thread tilts to the negative side by 0.17°, corresponding to the difference of 0.006 inch. Since there are two threads (female threads 4), one pin 3 corresponding to the pin A and the other pin 3 corresponding to the pin B, and two thread portions (female threads 4), one on the end A side corresponding to the pin A side of the coupling 5 and the other on the end B side corresponding to the pin B side, the thread taper angle parameter $\Delta\omega$ will affect the shoulder angle in the range of $-0.340 \leq \Delta\omega \leq +0.34°$ depending on the combination of thread tapers.

In this embodiment, the inclination of the thread taper of each pin 3 is made shallow and the inclination of the thread taper of the coupling 5 is made deep for the purpose of reducing the high circumferential stress generated at the coupling end, and the taper target is intentionally varied to weaken the contact at the coupling end. Each pin thread according to this embodiment has a target thread taper of 0.062 inch/inch (3.5478°) with a tolerance range of 0.0610 inch/inch to 0.066 inch/inch (3.4907° to 3.776°), and each coupling thread has a target thread taper of 0.064 inch/inch (3.6619°) with a narrow tolerance range of 0.063 inch/inch to 0.066 inch/inch (3.6049° to 3.7760°). The reduction of circumferential stress is one design factor to prevent the coupling 5 of the threaded joint 1 from developing and propagating cracks in the axial direction on the outer surface of the coupling due to sulfide stress corrosion cracking (SSC) and causing fracture of the coupling 5 when the laid oil country tubular goods are exposed to a sour environment.

In the case of this embodiment, the thread taper angle parameter $\Delta\omega$ will affect the shoulder angle in the range of $-0.17°\leq\Delta\omega\leq+0.29°$ depending on the combination of thread tapers.

[Shoulder Angle $\theta$ and Shoulder Angle Parameter $\Delta\theta$]

Since the threaded joint 1 according to this embodiment comprises a pair of pins 3 that are abutted against each other, the setting of the shoulder angle at the distal end of each pin directly affects the contact state. As illustrated in FIG. 4, the shoulder angle is set at 0° for the case of right-angled cutting work, and an inclination of the shoulder face where a space opens on the shoulder outer diameter side is defined as "positive" and the opposite as "negative". Since each pin 3 has a shoulder, when $\theta$A denotes the shoulder angle of the pin A and $\theta$B denotes the shoulder angle of the pin B, the shoulder angle parameter $\Delta\theta$ is given by: $\Delta\theta=\theta A+B$.

From the structure of the formula of $\Delta\theta$, it is "positive" when a space opens on the outer diameter side of the two shoulders of the pins A and B, and "negative" when a space opens on the inner diameter side of the shoulders. If the inclinations $\theta$ and $\Delta\theta$ are too large, whether positive or negative, stress concentration occurs on the outer or inner diameter side of the shoulders, causing local plastic deformation. This affects the seizure resistance of the threaded joint 1 in cyclic make-up and break-out.

Through the experiments (examples) described below, it was found that a suitable relationship between the shoulder angle parameter $\Delta\theta$ and the thread taper angle parameter $\Delta\omega$ is defined by:

$$-1.5°\leq\Delta\theta-\Delta\omega\leq2.0° \tag{1}$$

In the study of the thread taper angle difference parameter $\Delta\omega$ already mentioned, since $\Delta\omega$ is $-0.17°\leq\Delta\omega\leq+0.29°$, there is a suitable range for $\Delta\theta$, and if $\Delta\theta$ is in the range of $-1.21°\leq\Delta\theta\leq1.83°$, seizure resistance and airtightness are ensured under the set torque regardless of the taper angle difference.

In order to improve the seizure resistance, the shoulder faces 6 of the pin A and the pin B were treated by blasting, and the surface roughness in Ra was set in the range of 63 μinch to 190 μinch (1.6 μm to 4.8 μm). This means that the surface roughness Ra of the shoulder faces 6 is in the range of 63 μinch (1.6 μm)$\leq$Ra$\leq$190 μinch (4.8 μm). Upon screw make-up, lubricant was applied thinly and evenly to the blasted shoulder faces 6 as well as to the thread portions beforehand.

[Thread Interference on Diameter]

Figure 1A:
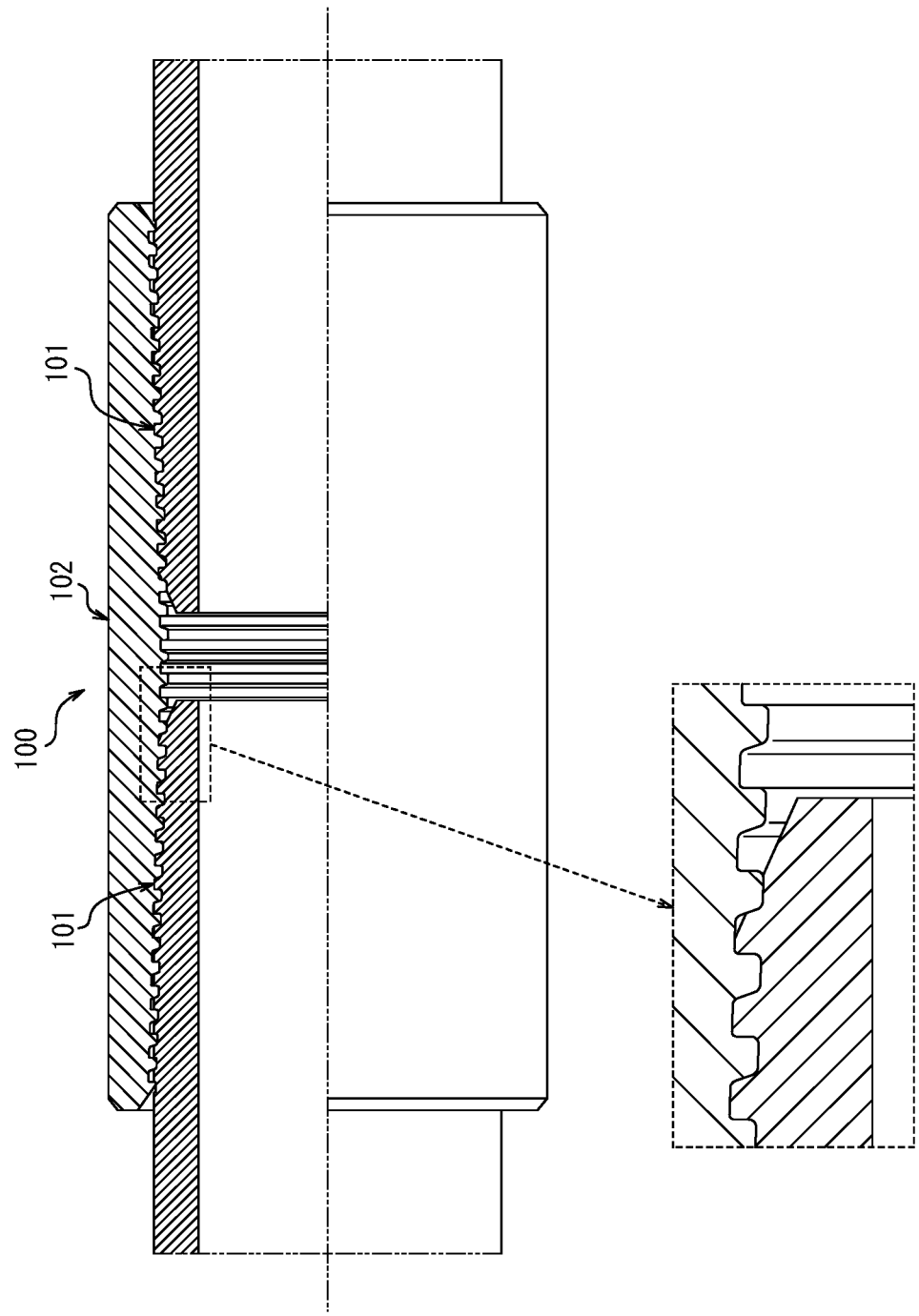
FIG. 1A is a cross-sectional view of an example of a conventional threaded joint.
Figure 11:
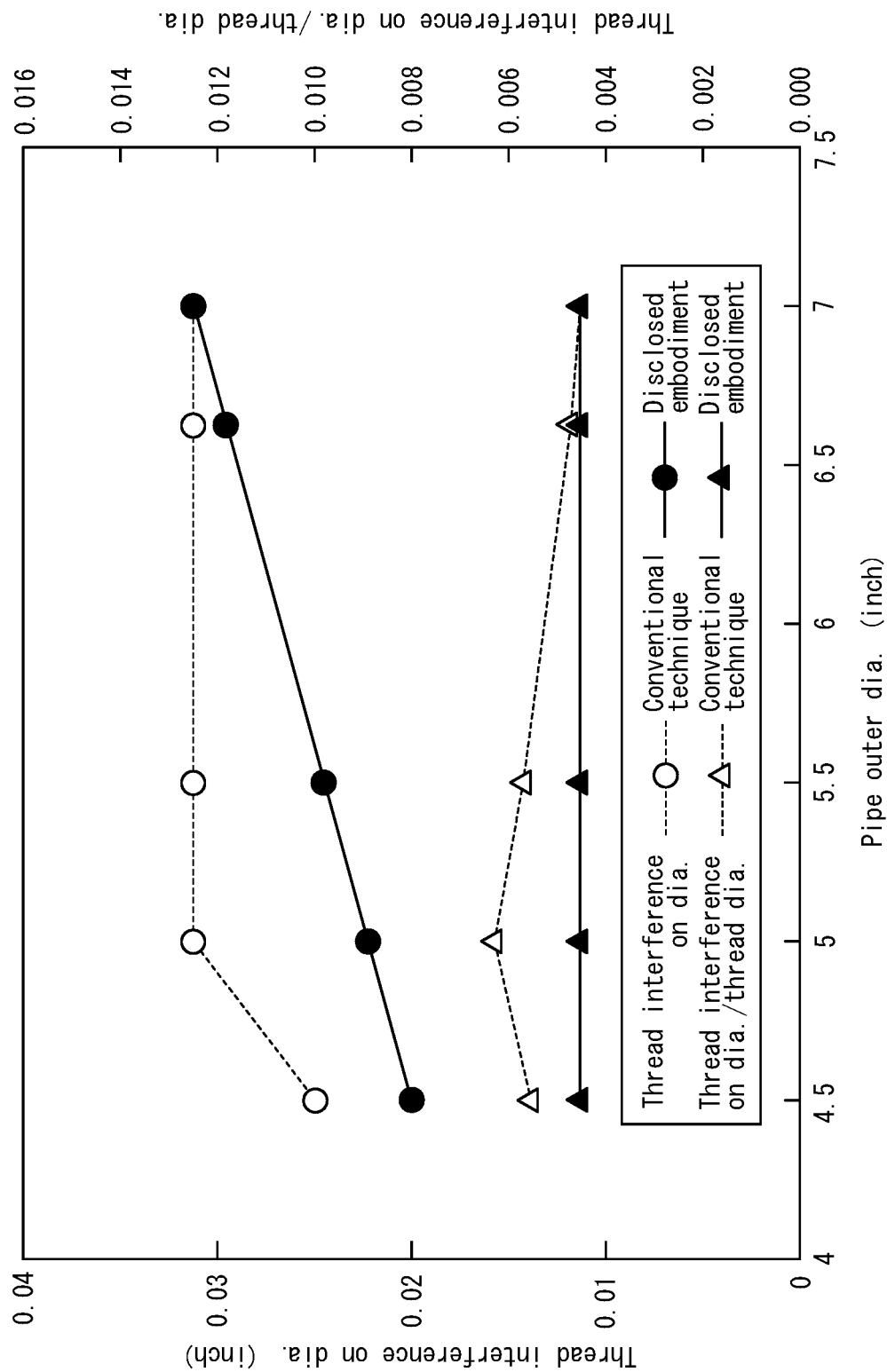
FIG. 11 is a graph illustrating a comparison of the thread interference on diameter between the conventional technology and the present embodiment.

One of the factors affecting the abutment state between the shoulder faces 6 at the distal ends of the pins is a downward (toward the pipe inner surface side) deflection at the distal end of each pin due to diameter reduction associated with thread fitting, as illustrated in FIGS. 6A and 6B. FIG. 11 illustrates a comparison of the thread interference on diameter between the conventional technology illustrated in FIG. 1A and the present embodiment. Due to the fitting between the thread portions of the pins and the thread portions of the coupling 5, the surface pressure at the contact surface is proportional to the thread interference on diameter in accordance with the Shrink Fit theory. If the surface pressure is considered as an equally distributed load W generated over the thread portions, the deflection is proportional to the thread interference on diameter when each pin cross section is approximated linearly as a cantilever beam as illustrated in FIGS. 6A and 6B. It can be seen that the downward (toward the pipe inner surface side) deflection at the distal end of each pin due to diameter reduction associated with thread fitting is eventually proportional to the thread interference on diameter.

Figure 1B:
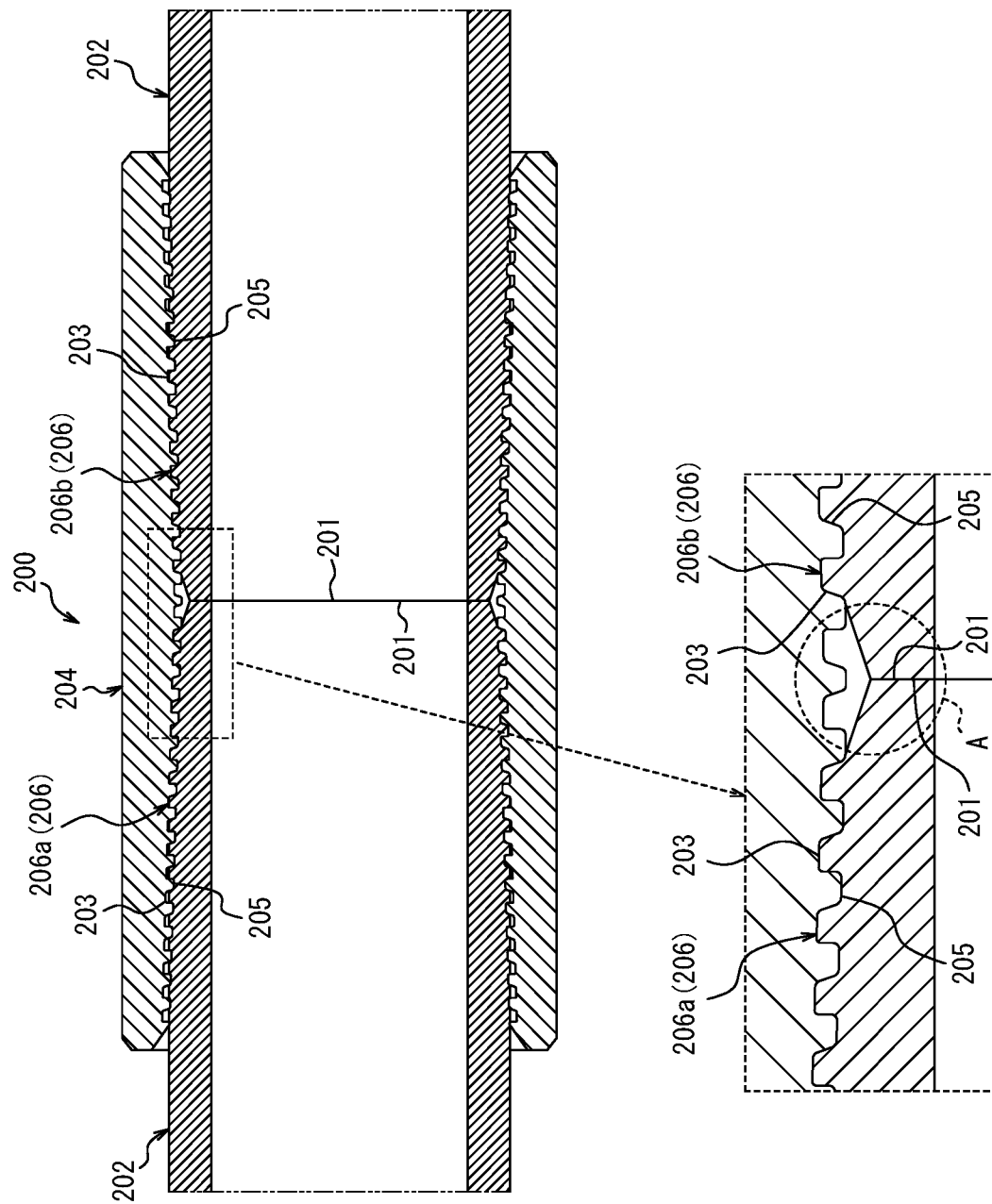
FIG. 1B is a cross-sectional view of another example of a conventional threaded joint.
Figure 2:
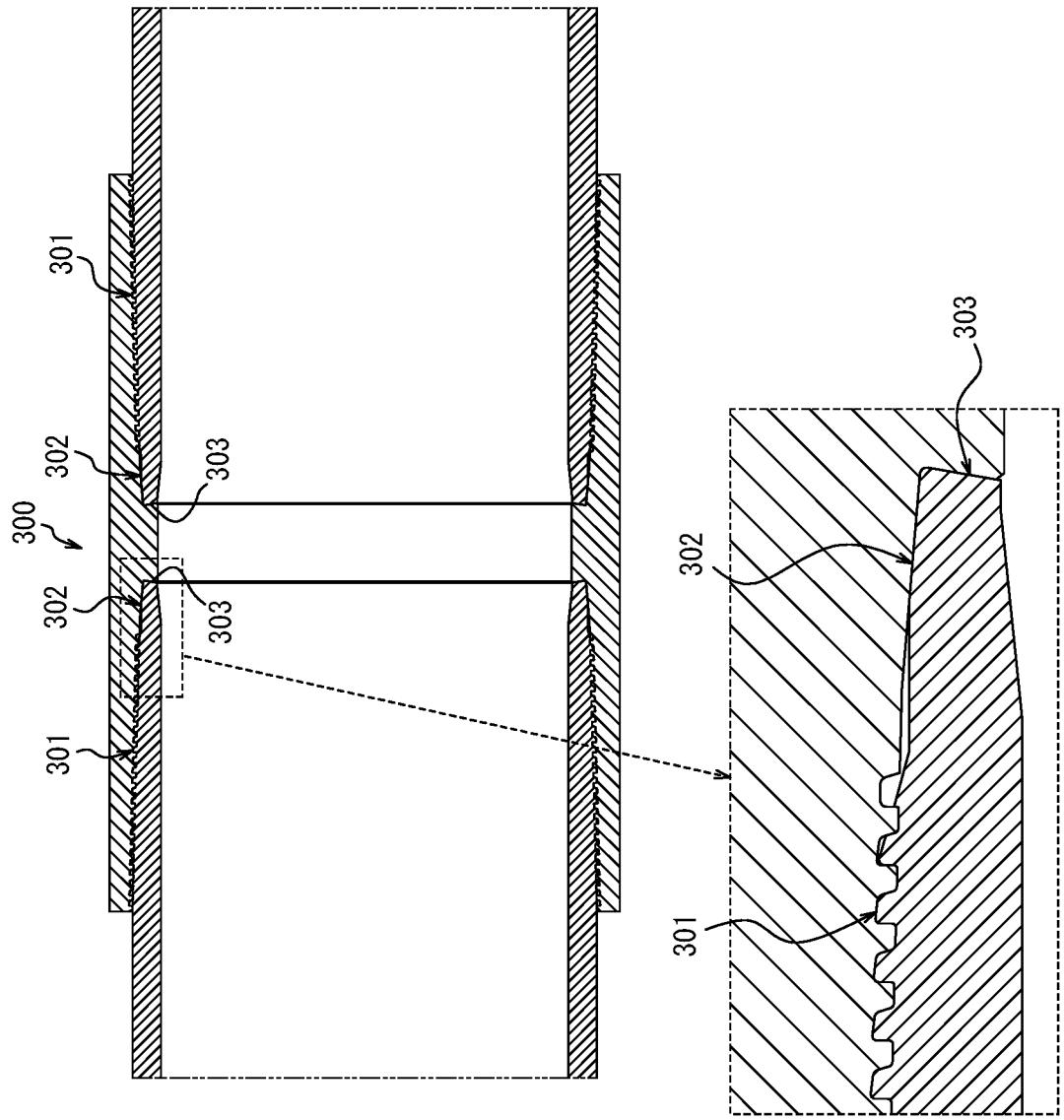
FIG. 2 is a cross-sectional view of yet another example of a conventional threaded joint.
Figure 3A:
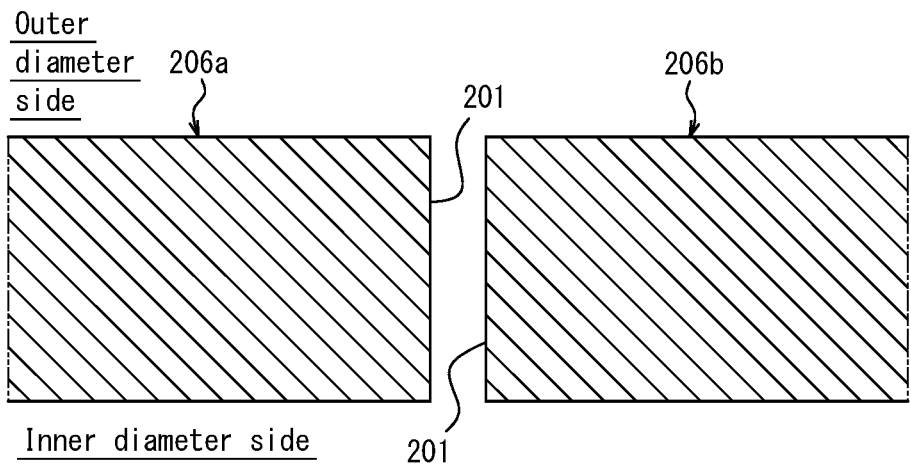
FIG. 3A is a conceptual diagram for explaining the form of abutment between shoulders, where a shoulder face of a pin B is perpendicular relative to a shoulder face of a pin A.
Figure 3B:
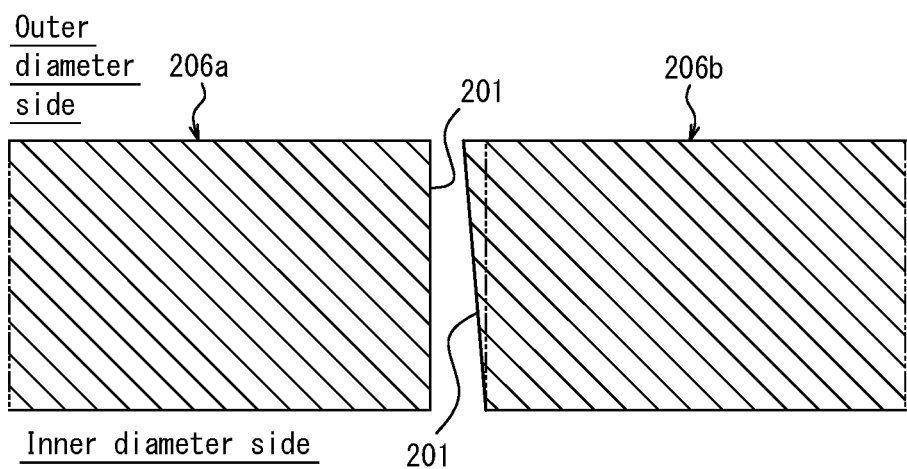
FIG. 3B is a conceptual diagram for explaining the form of abutment between shoulders, where a shoulder face of a pin B is inclined to the negative side relative to a shoulder face of a pin A.
Figure 3C:
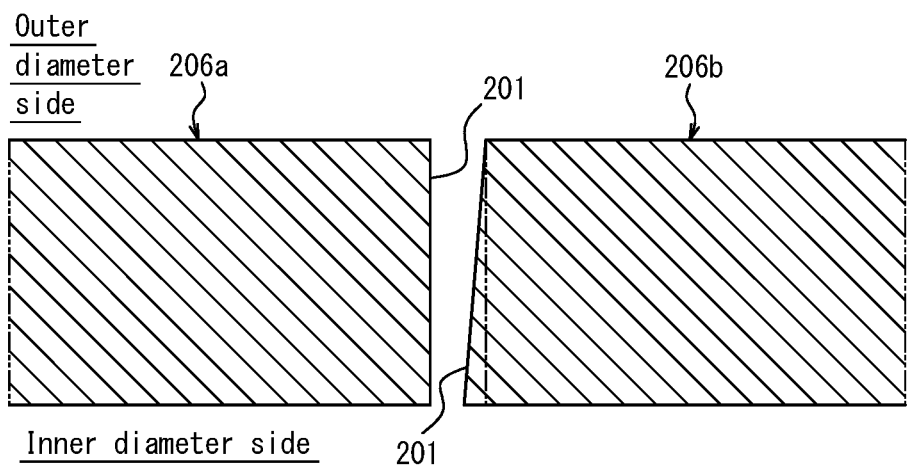
FIG. 3C is a conceptual diagram for explaining the form of abutment between shoulders, where a shoulder face of a pin B is inclined to the positive side relative to a shoulder face of a pin A.

As illustrated in FIG. 11, in this embodiment, the thread interference on diameter is smaller than that of the conventional technology, and the value is 0.0045, which is obtained by dividing the thread interference on diameter by the thread representative diameter of each pin (same as the thread diameter E7 at the L7 position of the conventional thread; see FIG. 1 and page 11 of NPL 1), and the ratio of the thread interference between each pin and each coupling thread, i.e., the thread fitting ratio, was kept constant regardless of the outer diameter size of the pipe body. In other words, the design value for the thread fitting ratio is 0.0045, and the actual thread fitting ratio is 0.0032 or more and 0.0059 or less based on the tolerance of the thread interference on diameter (+/−0.006"). The inclination of each shoulder face 6 due to the thread interference on diameter was confirmed by FEA to be a maximum of 0.01 degrees, and the inclination of each shoulder face 6 caused by the downward (toward the pipe inner surface side) deflection at the distal end of each pin due to diameter reduction associated with thread fitting was reduced to a negligible level. In other words, the thread fitting ratio should be 0.0032 or more and 0.0059 or less to obtain the effect more reliably. As long as the inclination of each shoulder face 6 can be ignored, the actual thread fitting ratio is not limited to the range of 0.0032 to 0.0059.

Unless otherwise specified, the dimensions of the threads in the present application refer to the dimensions after the threading process, which are measured and confirmed before tightening.

Considering that each shoulder face tilts toward the inner surface side (negative side) due to screw make-up, the relationship between the shoulder angle parameter $\Delta\theta$ and the thread taper angle parameter $\Delta\omega$ is more preferably defined by Expression (3) below. In other words, to obtain the effect, it is more reliable to adjust $\Delta\theta-\Delta\omega$ on the positive side. By adjusting on the positive side, the yield torque can be set higher as illustrated in FIGS. 7A and 7B.

$$0°<\Delta\theta-\Delta\omega\leq2.0° \tag{3}$$

[Tightening Torque T]

As a result of investigations and experiments, the inventors found that the yield torque of the threaded joint 1 for steel pipes, in which the pins 3, which are screwed from both ends of the coupling 5, are abutted against each other in the center of the axial direction of the coupling 5, can be evaluated on the safe side by applying the variables in Expression (2) below, as shown in APPENDIX-A of API7G Recommended Practice for Drill Stem Design and Operating Limits, Dec. 1, 1998 (NPL 2), to the threaded joint 1 of pin contact type.

$$T = (T_S + T_D)\frac{1}{12} \tag{2}$$

$$T_S = f_i P_c \frac{E_7}{2}(2\pi E_7)L_4\frac{1}{2}$$

$$P_c = E\frac{\rho_m}{2}\frac{\left(\left(\frac{W}{2}\right)^2 - \left(\frac{E_7}{2}\right)^2\right)\left(\left(\frac{E_7}{2}\right)^2 - \left(\frac{d}{2}\right)^2\right)}{2\left(\frac{E_7}{2}\right)^3\left(\left(\frac{W}{2}\right)^2 - \left(\frac{d}{2}\right)^2\right)}$$

$$T_D = Y_m A_S\left(\frac{P}{2\pi} + \frac{R_t f_s}{\cos\Theta} + R_s f_s\right),$$

where
T: yield torque [ft-lbf]
$T_S$: shouldering torque [inch-lbf]
$T_D$: delta torque [inch-lbf]
$P_c$: contact pressure in the threads [psi]
$f_t$: friction coefficient of threads (=0.035)
$f_s$: friction coefficient of threads (=0.080)
$E_7$: thread pitch diameter [inch]
$L_4$: thread length [inch]
w: coupling outer diameter (OD) [inch]
d: pipe inner diameter (ID) [inch]
$D_{bv}$: bevel diameter [inch]
P: lead of thread (=$1/T_{PI}$) [inch]
$\rho_m$: thread interference on diameter [inch]
$A_s$: shoulder cross section (=$\pi(D_{bv}^2-d^2)/4$) [inch$^2$]
$R_t$: average mean thread radius (=$E_7/2$) [inch]
$R_s$: mean shoulder radius (=$(D_{bv}+d)/4$)
Θ: thread flank angle [deg.]
E: Young's modulus [psi]
Ym: material yield stress [psi]

For example, in the case of the threaded joint 1 according to this embodiment having the specifications listed in Table 1 below, the yield torque rating is 23,410 ft-lbf (31,740 N-m). The actual value in the yield torque test conducted on the threaded joint 1 of an actual pipe is 28,000 ft-lbf (37,960 N-m) or more, which allows for evaluations on the safe side and in a practical manner. For the threaded joint 1 having the specifications listed in Table 2, the maximum tightening torque was set at 19,890 ft-lbf (26,970 N-m), which is 85% of the yield torque obtained by the evaluation formula. This is mainly due to variations in the frictional coefficient caused by individual differences in lubricants, and variations in the tightening environment such as temperature, humidity, and moisture during on-site tightening. For reference, the maximum tightening torque for the same diameter, thickness, and strength of the APIBTC thread in NPL 1 is 4,700 ft-lbf (6,370 N-m), indicating that the threaded joint 1 of shoulder abutment type can be tightened with a higher torque than that of a threaded joint of non-shoulder abutment type.

TABLE 1

| Pipe OD | OD | 5.5 inch (139.7 mm) |
|---|---|---|
| Pipe thickness | WT | 0.361 inch (9.17 mm) |
| Pipe ID: inch | d | 4.778 inch (121.36 mm) |
| Coupling OD: inch | W | 6.300 inch (160.02 mm) |
| Thread length: inch | $L_4$ | 3.8250 inch (97.155 mm) |
| Thread pitch Dia.: inch | $E_7$ | 5.454 inch (138.53 mm) |
| Thread interference on dia. | $\rho_m$ | 0.02456 inch (0.625 mm) |
| Lead of thread | P | 0.200 inch (5.08 mm) |
| Shoulder cross section | $A_s$ | 3.699 inch2 (2386.4 mm$^2$) |
| Mean thread radius | $R_t$ | 2.727 inch (69.266 mm) |
| Mean shoulder radius | $R_s$ | 2.5245 inch (64.122 mm) |
| Bevel Dia. | $D_{bv}$ | 5.248 inch (133.299 mm) |
| Thread flank angle | Θ | 10 deg. |
| Young's modulus | E | 30,000,000 psi (206,850 N/mm$^2$) |
| Material Yield stress | $Y_m$ | 135000 psi (931 N/mm$^2$) |

[Tightening Method]

Since the contact state between the shoulder faces 6 of the pins 3, which are inserted from both ends of the coupling 5 by thread fitting, is important for the performance of the threaded joint 1 of this embodiment, care must be taken in tightening the pins 3 and the coupling 5. When tightening the threaded joint 1, lubricant is applied evenly to the thread faces and shoulder faces 6 of both of each pin 3 and coupling 5, or to the threaded faces and shoulder faces 6 of either of them, and tightening is performed such that there is no direct metal-to-metal contact. However, due to differences in the frictional coefficient caused by individual differences in lubricants, the gripping position of the pipe with the coupling 5 in the tightening machine, and variations in each thread design element even within the tolerance range, the axial position of each pin 3 that fits within the coupling 5 may shift from the center line in the axial direction of the coupling 5 even with the same tightening torque.

Figure 12:
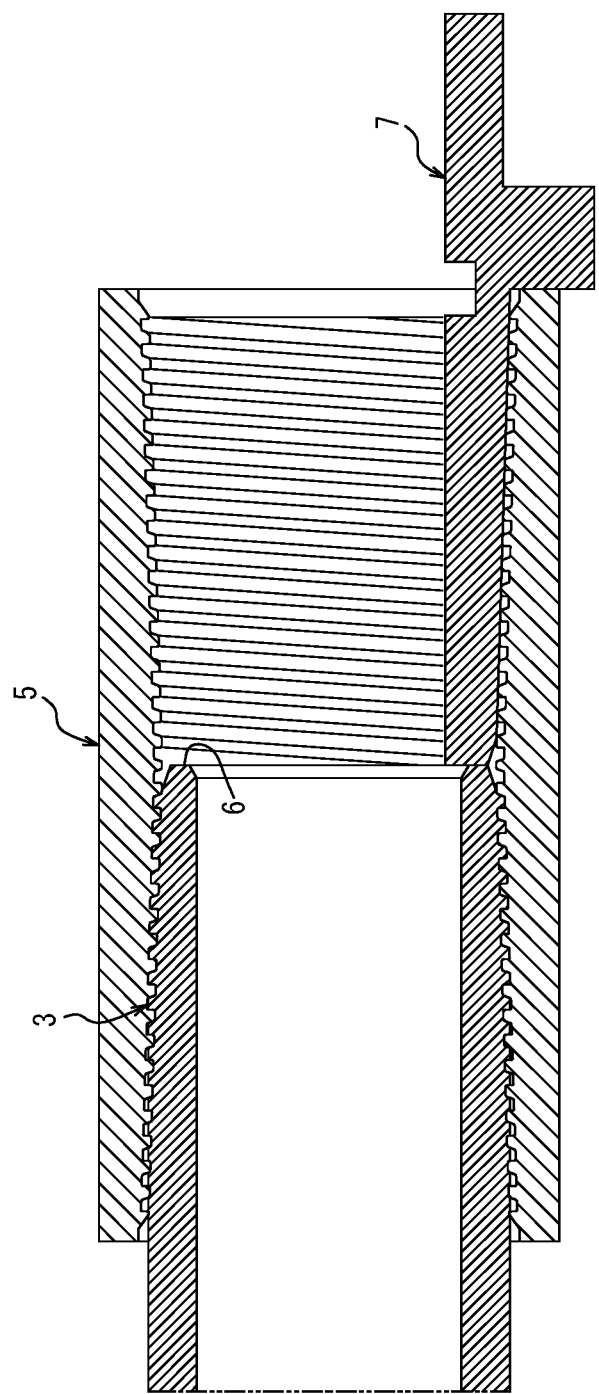
FIG. 12 is a cross-sectional view illustrating an example of the method of connecting the threaded joint.

In order to prevent the axial position of the pin A after tightening from not reaching or exceeding the center line in the axial direction of the coupling 5, in the threaded joint 1 of this embodiment, as illustrated in FIG. 12, when tightening each pin 3 on the end A side to be tightened in the factory, it is preferable to insert a jig 7 for position adjustment in advance from the end face of the coupling 5 on the end B side opposite to the end A side. As a result of the insertion, the jig 7 serves as a stopper and can properly position the shoulder face 6 at the distal end of the pin A on the center line of the inner surface of the coupling. In other words, when connecting the threaded joint 1 according to this embodiment, it is preferable that the tightening of one pin 3 (pin A) to be thread-fitted into the coupling 5 first is controlled on the center line in the axial direction of the coupling 5 using the jig 7 indicating a tightening stop position of the one pin 3 (pin A) inserted from one end side (end A side) of the coupling 5, and then cause the shoulder faces 6 of the one pin (pin A) and the other pin (pin B) to be abutted against each other when the other pin 3 (pin B) is tightened. In this way, at the time of screw make-up of the pin B, the pin A has already been tightened at the controlled position, and the shoulder faces 6 of the pin A and the pin B can be brought into contact with each other as intended on the center line of the inner surface of the coupling even with various variations as mentioned above.

EXAMPLES

The effects of this embodiment will be explained based on examples.

Table 2 illustrates the specifications of the pipes and couplings used in the thread tests. After fabrication of the test specimens with these specifications, the shoulder angles θA and θB and the thread taper angles ωPA and ωPB of the pins A and B, and the thread taper angles ωCA and ωCB of the end A and end B sides of the couplings 5 were measured as listed in Table 3, and the following performance was evaluated using these test specimens. The thread fitting ratio was set at 0.0045 as the design value, and the actual thread fitting ratio of the test specimens was in the range of 0.0032 to 0.0059 due to the tolerance of the thread interference on diameter (+/−0.006"). In the conventional APIBTC thread, the actual thread fitting ratio is in the range of 0.0036 to 0.0083 because the design value of the thread fitting ratio differs depending on the outer diameter and the tolerance of the thread interference on diameter (+0.006"/−0.010") is wide, as illustrated in FIG. 11. The surface roughness Ra of the shoulder faces was set in the range of 63 μinch to 190 pinch (1.6 μm to 4.8 μm).

TABLE 2

|  | Pipe | Coupling |
|---|---|---|
| Outer diameter | 5.5 inch (139.7 mm) | 6.3 inch (160.02 mm) |
| Pipe thickness | 0.361 inch (9.17 mm) | 0.459 inch (11.65 mm) at most |
| Thread shape | Trapezoidal thread | Trapezoidal thread |
|  | Stabbing flank angle 10° | Stabbing flank angle 10° |
|  | Loading flank angle 3° | Loading flank angle 3° |
| Thread height | 0.062 inch (1.57 mm) | 0.066 inch (1.68 mm) |
| Thread pitch | 0.2 inch (5.08 mm) | 0.2 inch (5.08 mm) |
| Thread interference on dia. | 0.02456 inch (0.625 mm) | |
| Material | Yield stress 135000 psi (931 N/mm²) | |
| Tightening torque | 14,050 to 19,890 ft-lbf (19,050 to 26,970 N-m) | |

TABLE 3

| Case No. | Soulder angle A pin | Soulder angle B pin | Thread taper (angle) End A side Pin | Thread taper (angle) End A side Coupling | Thread taper (angle) Enc B side Pin | Thread taper (angle) Enc B side Coupling | Shoulder angle difference Δθ | Thread taper angle difference Δω | Δθ − Δω | Make and break test | Make/break and seal tests | Remarks |
|---|---|---|---|---|---|---|---|---|---|---|---|---|
| 1 | 0.1 | 0.2 | 1.79 | 1.79 | 1.79 | 1.79 | 0.3 | 0.00 | 0.3 | Passed | Passed | Example |
| 2 | −0.1 | 1 | 1.79 | 1.79 | 1.79 | 1.79 | 0.9 | 0.00 | 0.9 | Passed | Passed | Example |
| 3 | 0.8 | 1.2 | 1.79 | 1.79 | 1.79 | 1.79 | 2.0 | 0.00 | 2.0 | Passed | Passed | Example |
| 4 | 0.1 | 1.8 | 1.79 | 1.79 | 1.79 | 1.79 | 1.9 | 0.00 | 1.9 | Passed | Passed | Example |
| 5 | −1 | 2.5 | 1.79 | 1.79 | 1.79 | 1.79 | 1.5 | 0.00 | 1.5 | Passed | Passed | Example |
| 6 | −0.3 | 2.5 | 1.79 | 1.79 | 1.79 | 1.79 | 2.2 | 0.00 | 2.2 | Failed (seizure occurred on fifth attempt) | — | Comparative example |
| 7 | −0.2 | 2.8 | 1.79 | 1.79 | 1.79 | 1.79 | 2.6 | 0.00 | 2.6 | Failed (seizure occurred on third attempt) | — | Comparative example |
| 8 | −0.6 | 0.1 | 1.79 | 1.79 | 1.79 | 1.79 | −0.5 | 0.00 | −0.5 | Passed | Passed | Example |
| 9 | −1 | 0.1 | 1.79 | 1.79 | 1.79 | 1.79 | −0.9 | 0.00 | −0.9 | Passed | Passed | Example |
| 10 | −1.5 | 0.2 | 1.79 | 1.79 | 1.79 | 1.79 | −1.3 | 0.00 | −1.3 | Passed | Passed | Example |
| 11 | −1.1 | −0.4 | 1.79 | 1.79 | 1.79 | 1.79 | −1.5 | 0.00 | −1.5 | Passed | Passed | Example |
| 12 | −1.1 | −0.6 | 1.79 | 1.79 | 1.79 | 1.79 | −1.7 | 0.00 | −1.7 | Failed (seizure occurred on fifth attempt) | — | Comparative example |
| 13 | −1.9 | 0.1 | 1.79 | 1.79 | 1.79 | 1.79 | −1.8 | 0.00 | −1.8 | Failed (seizure occurred on fourth attempt) | — | Comparative example |
| 14 | −0.1 | 2.2 | 1.72 | 1.79 | 1.72 | 1.92 | 2.1 | 0.27 | 1.8 | Passed | Passed | Example |
| 15 | −0.1 | 2.4 | 1.75 | 1.87 | 1.75 | 1.89 | 2.3 | 0.27 | 2.0 | Passed | Passed | Example |
| 16 | 0 | 2 | 1.89 | 1.85 | 1.89 | 1.79 | 2.0 | −0.14 | 2.1 | Failed (seizure occurred on sixth attempt) | — | Comparative example |
| 17 | 0 | 2 | 1.89 | 1.72 | 1.89 | 1.72 | 2.0 | −0.34 | 2.3 | Failed (seizure occurred on fifth attempt) | — | Comparative example |
| 18 | −1.6 | 0.1 | 1.75 | 1.83 | 1.77 | 1.80 | −1.5 | 0.11 | −1.6 | Failed (seizure occurred on fifth attempt) | — | Comparative example |
| 19 | −1.6 | 0.1 | 1.80 | 1.89 | 1.80 | 1.89 | −1.5 | 0.17 | −1.7 | Failed (seizure occurred on third attempt) | — | Comparative example |
| 20 | −1.7 | 0.2 | 1.83 | 1.86 | 1.80 | 1.92 | −1.5 | 0.14 | −1.6 | Failed (seizure occurred on fifth attempt) | — | Comparative example |
| 21 | −1.7 | 0.1 | 1.75 | 1.83 | 1.89 | 1.72 | −1.6 | −0.09 | −1.5 | Passed | Passed | Example |
| 22 | −1.6 | 0.1 | 1.83 | 1.72 | 1.83 | 1.76 | −1.5 | −0.19 | −1.3 | Passed | Passed | Example |
| 23 | −1.7 | 0.2 | 1.89 | 1.72 | 1.89 | 1.75 | −1.5 | −0.31 | −1.2 | Passed | Passed | Example |

[Cyclic Make and Break Test]

Lubricant was applied to the threads and shoulders, and cyclic make and break tests were conducted on each joint up to 10 times. After each break out, the presence or absence of seizure at the thread portion and the shoulder was checked. The tightening torque at each time was set to the maximum tightening torque of 19,890 ft-lbf (26,970 N-m) and the minimum tightening torque of 14,050 ft-lbf (19,050 N-m) as the passing range for each time, as explained in paragraph 0058 with the various specifications in Tables 2 and 3. In other words, each tightening was performed at a tightening torque of 60% or more and 85% or less of the yield torque determined by Expression (2). The following make/break and seal tests were conducted on those specimens that had completed the cyclic make and break tests 10 times without any problems.

[Make/Break and Seal Test]

After the cyclic make and break tests, the specimens were tightened again, and series B make/break and seal tests in accordance with CAL2 of ISO13679:2002 were conducted. The test specimens were subjected to a load equivalent to 95% of the minimum yield stress of the P110 standard of API5CT for maximum tension and 60% for maximum compression. Each make/break and seal test was performed by applying the axial force and pressure defined at each loading point prescribed in ISO 13679:2002, while checking for any internal leakage. Table 4 lists the results of the cyclic make and break tests and the make/break and seal tests. In the comparative examples, sticking occurred in the cyclic make and break tests. In contrast, all of the test specimens of our examples conforming to Expression (1) passed both the cyclic make and break tests and the make/break and seal tests.

[FEA Results]

Figure 13:
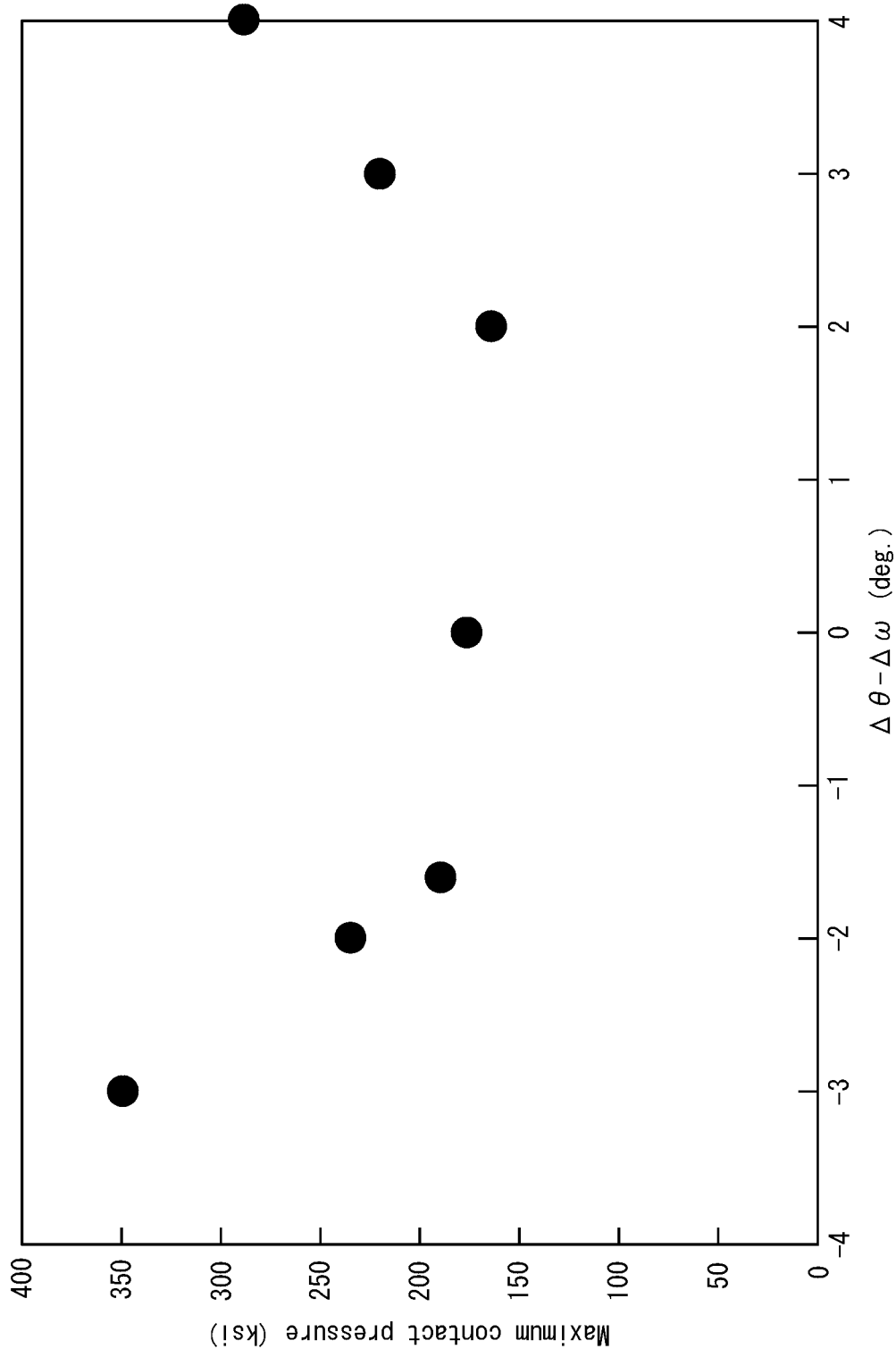
FIG. 13 is a graph illustrating the results of FEA indicating the relationship between the maximum contact pressure at the shoulder face and $\Delta\theta - \Delta\omega$.

In the results of FEA conducted separately, it was confirmed that the maximum contact pressure at the shoulder faces is significantly reduced when the relationship between the shoulder angle parameter $\Delta\theta$ and the thread taper angle parameter $\Delta\omega$ satisfies Expression (1), as illustrated in FIG. 13. In other words, the results illustrated in FIG. 13 indicate that setting the shoulder angle parameter and the thread taper angle parameter in a suitable range is effective in reducing the maximum contact pressure (and the contact pressure distribution around the area subjected to the maximum contact pressure) that contributes to the improvement of seizure resistance. In addition, although pipes with an outer diameter of 5.5 inch were used in the above experiments, it was confirmed that similar results can be obtained with pipes of 4.5 inch to 7 inch.

REFERENCE SIGNS LIST 1 threaded joint
2 male thread
3 pin
4 female thread
5 coupling
16 shoulder face
7 jig

The invention claimed is:

1. A threaded joint comprising:
a pair of pins each having a male thread, as a male tapered thread, provided on an outer circumferential surface at a distal end of a first steel pipe; and
a coupling having female threads, as female tapered threads, provided on an inner circumferential surface at both ends of a second steel pipe, the female threads being configured to be screwed into the male threads, wherein
the threaded joint is configured such that shoulder faces at the distal ends of the pair of pins are brought into contact with each other when the male threads are screwed into the female threads at both ends of the coupling,
a relationship between shoulder angle parameters and thread taper angle parameters for the coupling and the pair of pins inserted from both ends of the coupling is defined by the following expression (1), and
a tightening torque with which the threaded joint is tightened is 60% or more and 85% or less of a yield torque determined by the following expression (2):

$$-1.5° \leq \Delta\theta - \Delta\omega \leq 2.0° \quad (1),$$

where
$\Delta\theta$ is a shoulder angle parameter that is a sum of shoulder angles OA and OB before tightening of the pair of pins, i.e., $\Delta\theta = \theta A + \theta B$, and
$\Delta\omega$ is a thread taper angle parameter that is a sum of thread taper angle differences $\Delta\omega A$ and $\Delta\omega$ before tightening of the coupling and the pair of pins, i.e., $\Delta\omega = \Delta\omega + \Delta\omega$, $$T = (T_S + T_D)\frac{1}{12} \quad (2)$$

$$T_S = f_t P_c \frac{E_7}{2}(2\pi E_7)L_4 \frac{1}{2}$$

$$P_c = E\frac{\rho_m}{2}\frac{\left(\left(\frac{W}{2}\right)^2 - \left(\frac{E_7}{2}\right)^2\right)\left(\left(\frac{E_7}{2}\right)^2 - \left(\frac{d}{2}\right)^2\right)}{2\left(\frac{E_7}{2}\right)^3\left(\left(\frac{W}{2}\right)^2 - \left(\frac{d}{2}\right)^2\right)}$$

$$T_D = Y_m A_S\left(\frac{P}{2\pi} + \frac{R_t f_s}{\cos\Theta} + R_s f_s\right).$$

where
T: yield torque [ft-lbf]
$T_S$ is shouldering torque [inch-lbf],
$T_D$ is delta torque [inch-lbf],
$P_c$ is thread contact pressure [psi],
$f_t$ is thread frictional coefficient (=0.035),
$f_s$ is thread frictional coefficient (=0.080),
$E_7$ is thread pitch diameter [inch],
$L_4$ is thread length [inch],
w is coupling outer diameter [inch],
d is pipe inner diameter [inch],
$D_{bv}$ is bevel diameter [inch],
P is thread lead (=1/$T_{PI}$) [inch],
$\rho_m$ is thread interference on diameter [inch],
$A_s$ is shoulder cross-sectional area (=$\pi(Dbv^2-d^2)/4$) [inch$^2$],
$R_t$ is average mean thread radius (=$E_7/2$) [inch],
$R_s$ is average shoulder radius (=($D_{bv}$+d)/4),
$\Theta$ is thread flank angle [deg.],
E is Young's modulus [psi], and
Ym is material yield stress [psi].

2. The threaded joint according to claim 1, wherein the relationship is defined by the following expression (3):

$$0° < \Delta\theta - \Delta\omega \leq 2.0° \quad (3).$$

3. The threaded joint according to claim 1, wherein the shoulder angle parameter $\Delta\theta$ is $-1.21° \leq \Delta\theta \leq 1.83°$.

4. The threaded joint according to claim 1, having a thread fitting ratio of 0.0032 or more and 0.0059 or less.

5. A method of connecting the threaded joint of claim 1, the method comprising: controlling a position of tightening of one of the pair of pins that is thread-fitted into the coupling first to be on the center line in the axial direction of the coupling with a jig indicating a tightening stop position of the one of the pair of pins inserted from one end of the coupling; and then tightening the other of the pair of pins such that shoulder faces of the one and the other of the pair of pins are abutted against each other.

* * * * *